United States Patent
Homma et al.

(10) Patent No.: US 10,574,948 B2
(45) Date of Patent: Feb. 25, 2020

(54) PROJECTOR, FUNCTIONAL FILTER, AND SUBSTITUTE GLASS PLATE

(71) Applicant: SONY CORPORATION, Tokyo (JP)

(72) Inventors: Keisuke Homma, Kanagawa (JP); Yuichi Takahashi, Kanagawa (JP); Kazuya Matsumoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 200 days.

(21) Appl. No.: 15/544,131

(22) PCT Filed: Dec. 18, 2015

(86) PCT No.: PCT/JP2015/006327
§ 371 (c)(1),
(2) Date: Jul. 17, 2017

(87) PCT Pub. No.: WO2016/125222
PCT Pub. Date: Aug. 11, 2016

(65) Prior Publication Data
US 2018/0013990 A1      Jan. 11, 2018

(30) Foreign Application Priority Data

Feb. 5, 2015   (JP) .................... 2015-021236

(51) Int. Cl.
*G03B 21/14* (2006.01)
*H04N 9/31* (2006.01)
(Continued)

(52) U.S. Cl.
CPC ....... *H04N 9/3105* (2013.01); *G02B 27/0905* (2013.01); *G02B 27/149* (2013.01); *G03B 21/006* (2013.01); *G03B 21/14* (2013.01); *G03B 21/16* (2013.01); *G03B 21/2073* (2013.01); *G03B 21/54* (2013.01); *H04N 9/3144* (2013.01); *H04N 9/3167* (2013.01)

(58) Field of Classification Search
CPC .... G03B 21/006; G03B 21/14; G03B 21/142; G03B 21/54; G03B 21/147; H04N 9/3105
USPC .................................................. 353/100, 101
See application file for complete search history.

(56) References Cited

U.S. PATENT DOCUMENTS

| 2003/0147051 A1 | 8/2003 | Fujita et al. |
| 2005/0110962 A1 | 5/2005 | Watanabe et al. |

(Continued)

FOREIGN PATENT DOCUMENTS

| CN | 101452184 | 6/2009 |
| CN | 201765420 | 3/2011 |

(Continued)

OTHER PUBLICATIONS

International Search Report dated Mar. 15, 2016 in PCT/JP2015/006327 filed Dec. 18, 2015.

(Continued)

*Primary Examiner* — Ryan D Howard
(74) *Attorney, Agent, or Firm* — Oblon, McClelland, Maier & Neustadt, L.L.P.

(57) ABSTRACT

[Solving Means] A projector according to the present technology includes a lightbulb, a projection section, and a replacement mechanism. The lightbulb modulates light. The projection section projects light modulated by the lightbulb. The replacement mechanism holds a transmissive member arranged on an optical path between the lightbulb and the projection section and is capable of replacing the transmissive member.

11 Claims, 16 Drawing Sheets

(51) Int. Cl.
*G03B 21/54* (2006.01)
*G02B 27/09* (2006.01)
*G02B 27/14* (2006.01)
*G03B 21/00* (2006.01)
*G03B 21/16* (2006.01)
*G03B 21/20* (2006.01)

(56) References Cited

U.S. PATENT DOCUMENTS

2007/0035802 A1  2/2007  Hirata et al.
2012/0194786 A1  8/2012  Koyama

FOREIGN PATENT DOCUMENTS

| JP | 2003-255128 A | 9/2003 |
| JP | 2005-121880 A | 5/2005 |
| JP | 2006-145863 A | 6/2006 |
| JP | 2007-47408 A | 2/2007 |
| JP | 2010-79253 A | 4/2010 |
| JP | 2010-134173 A | 6/2010 |
| JP | 2010-164726 A | 7/2010 |
| JP | 2012-159537 A | 8/2012 |

OTHER PUBLICATIONS

Japanese Office Action dated Sep. 10, 2019 in Patent Application No. 2016-572953 (without English Translation) p. 1-5.
Combined Chinese Office Action and Search Report dated Sep. 3, 2019 in Patent Application No. 201580074790.0 (with English language translation) p. 1-22.

PROJECTOR, FUNCTIONAL FILTER, AND SUBSTITUTE GLASS PLATE

TECHNICAL FIELD

The present technology relates to a technology of a projector that projects an image onto a screen, and the like.

BACKGROUND ART

From the past, a projector that projects an image onto a screen is widely known. Patent Literature 1 below describes a projector that is configured such that a color filter and a cover glass can be alternatively replaced on an optical path on a light-emitting side of a projection lens. In this projector, projection is performed in a color tone priority mode that prioritizes color reproducibility in a case where the color filter is arranged on the light-emitting side of the projection lens, whereas projection is performed in a luminance priority mode that prioritizes luminance in a case where the cover glass is arranged on the light-emitting side of the projection lens.

CITATION LIST

Patent Literature

Patent Literature 1: Japanese Patent Application Laid-open No. 2010-79253

DISCLOSURE OF INVENTION

Technical Problem

In the projector disclosed in Patent Literature 1, the color filter and cover glass can be replaced as necessary. However, if the color filter and cover glass are arranged on the light-emitting side of the projection lens, the color filter and cover glass need to be made large, which causes an increase in costs.

In view of the circumstances as described above, the present technology aims at providing a technology of a projector and the like, with which a transmissive member that transmits light can be replaced as necessary and the transmissive member can be made compact.

Solution to Problem

A projector according to the present technology includes a lightbulb, a projection section, and a replacement mechanism.

The lightbulb modulates light modulated by the lightbulb.

The projection section projects the light.

The replacement mechanism holds a transmissive member arranged on an optical path between the lightbulb and the projection section and is capable of replacing the transmissive member.

According to this projector, the transmissive member can be replaced with another transmissive member by the replacement mechanism as necessary. In addition, since the transmissive member is arranged on the optical path between the lightbulb and the projection lens, the transmissive member can be made compact. Accordingly, costs can be reduced.

In the projector, the replacement mechanism may include a transmissive member holding portion that detachably holds the transmissive member.

In this projector, the transmissive member can be easily replaced with another transmissive member by the attachment/detachment.

In the projector, the projection section may be replaceable with respect to the projector, and the projector may further include an exterior casing that includes an opening into which a part of the projection section can be inserted. In this case, the transmissive member may be replaced via the opening of the exterior casing in a state where the projection section is detached from the projector.

Accordingly, a user can easily replace the transmissive member via the opening formed on the exterior casing when the projection section is removed.

In the projector, the lightbulb may be a liquid crystal lightbulb, and the projector may further include a cross dichroic prism that is arranged on an optical path between the liquid crystal lightbulb and the projection section. In this case, the transmissive member may be arranged on an optical path between the cross dichroic prism and the projection section.

In the projector, the transmissive member may be arranged at a position closer to a light-emitting surface of the cross dichroic prism than a light-incident surface of the projection section.

Accordingly, the transmissive member can be made more compact.

In the projector, the replacement mechanism may include a transmissive member holding portion that detachably holds the transmissive member and holds the cross dichroic prism.

In the projector, the transmissive member may be held by a holder. In this case, the transmissive member holding portion may detachably hold the holder.

Accordingly, the transmissive member can be replaced appropriately.

In the projector, the transmissive member holding portion may include an opening that transmits the light, and the holder may be held by the transmissive member holding portion such that the holder covers the opening.

By the holder covering the opening in this way, it becomes possible to effectively prevent dust and the like from entering the optical path more on an upstream side than the opening (e.g., lightbulb).

In the projector, the transmissive member holding portion may include a first engagement groove and a second engagement groove. In this case, the holder may include a first engagement portion that is provided on one end portion side of the holder and engages with the first engagement groove and a second engagement portion that is provided on another end portion side of the holder and engages with the second engagement groove via a bias portion.

Accordingly, the transmissive member can be replaced appropriately.

In the projector, the replacement mechanism holds, on the optical path, a functional filter or the substitute glass plate as the transmissive member.

A functional filter according to the present technology is used in a projector including a replacement mechanism that holds, in a replaceable manner, the functional filter arranged on an optical path between a lightbulb that modulates light and a projection section that projects light modulated by the lightbulb.

A substitute glass plate according to the present technology is used in a projector including a replacement mechanism that holds, in a replaceable manner, the substitute glass plate arranged on an optical path between a lightbulb that modulates light and a projection section that projects light modulated by the lightbulb.

Advantageous Effects of Invention

As described above, according to the present technology, it is possible to provide a technology of a projector and the like, with which a transmissive member that transmits can be replaced as necessary and the transmissive member can be made compact.

MODE(S) FOR CARRYING OUT THE INVENTION

[Overall Configuration of Projector 100 and Configurations of Respective Sections]

Figure 1:
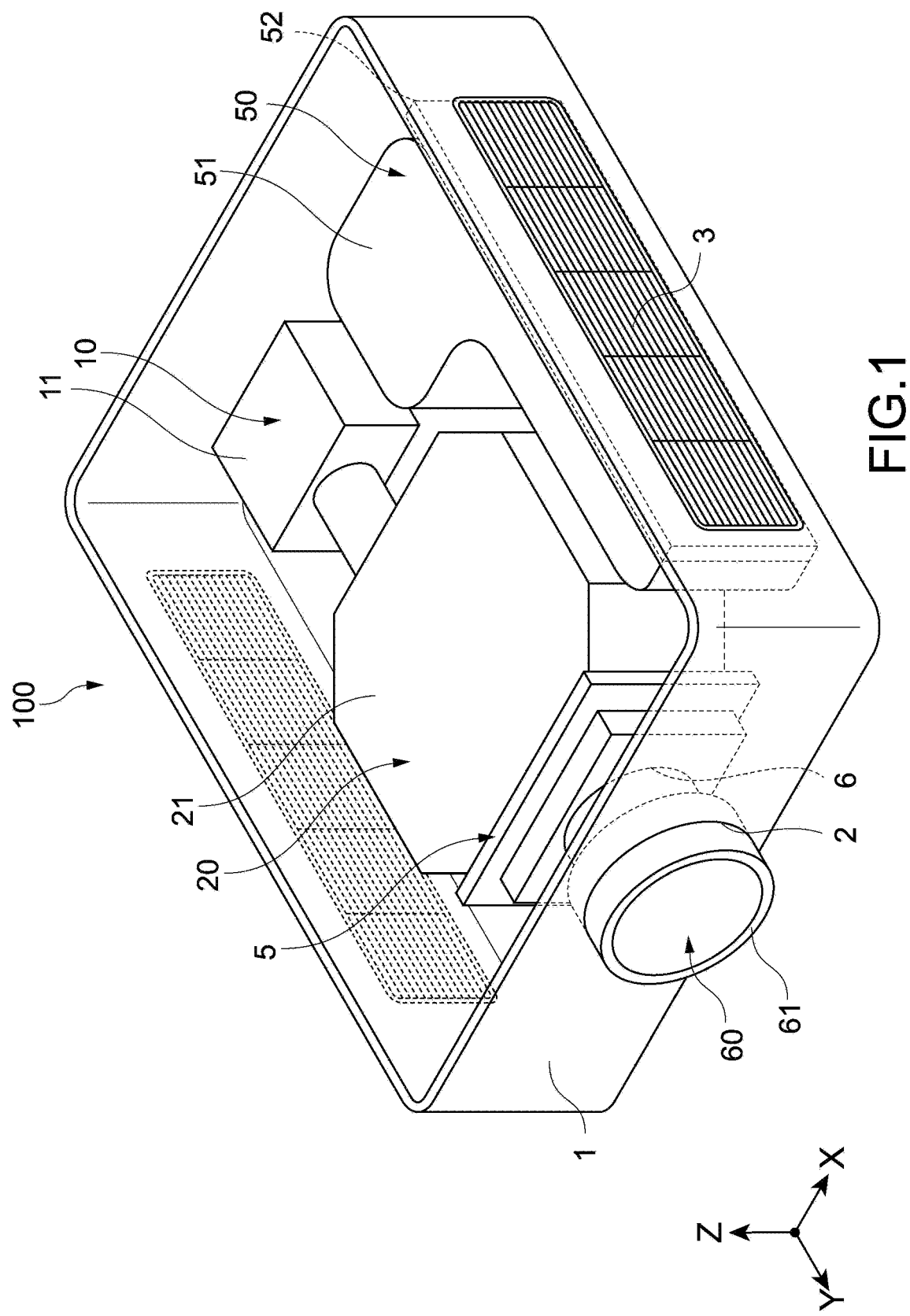
FIG. 1 A schematic perspective view of a projector according to an embodiment of the present technology.

FIG. 1 is a schematic perspective view of a projector 100 according to an embodiment of the present technology. It should be noted that in FIG. 1, for facilitating visualization of an internal configuration, an illustration of an upper portion of an exterior casing is omitted. The projector 100 of this embodiment is used as a projector 100 for presentations or digital cinema, for example. The present technology described below is also applicable to a projector 100 used for other purposes.

The projector 100 includes a light source section 10 capable of emitting light, an image generation section 20 that generates an image on the basis of light from the light source section 10, a cooling section 50 for cooling various optical systems (see FIG. 2) in the image generation section 20, and a projection section 60 that projects the image generated by the image generation section 20 on a screen (not shown). The projector 100 also includes an exterior casing 1 that accommodates therein the light source section 10, the image generation section 20, the cooling section 50, and the projection section 60.

It should be noted that although illustrations are omitted, the projector 100 includes a control section that collectively controls the respective sections of the projector 100, a storage section including volatile and nonvolatile memories, and a communication section communicable with other apparatuses. The control section, the storage section, and the communication section are mounted on a wiring substrate, and this wiring substrate is accommodated in the exterior casing 1.

The exterior casing 1 has a substantially-cuboid shape, and the projection section 60 is attached to a front surface portion side of the exterior casing 1. At the front surface portion of the exterior casing 1, an opening 2 into which a part of the projection section 60 can be inserted in a state where the projection section is attached to the exterior casing 1 is formed. This opening 2 is formed circularly in correspondence with the shape of the projection section 60 and has a diameter slightly larger than that of the projection section 60 on a front side. It should be noted that the size of this opening 2 is enough for at least a fingertip of a user (final consumer or serviceman (person whose maintenances etc. in place of final consumer); same holds true in descriptions below) to be inserted.

Further, inlets 3 are respectively formed on two side surface portions of the exterior casing 1. The inlets 3 are each formed in a rectangle that extends in a front-back direction (Y-axis direction) of the projector 100.

The light source section 10 is configured to emit laser light of a blue wavelength range and white light obtained by synthesizing light from a red wavelength range to a green wavelength range that is generated from fluorescent substances excited by that laser light. The light source section 10 includes a casing 11 for a light source, and a light source unit including a plurality of solid light sources, a phosphor unit that generates and emits white light upon receiving light of the light source unit, and the like are arranged inside this casing 11. It should be noted that the configuration of the light source section 10 is not limited in particular as long as it is capable of emitting white light.

The image generation section 20 generates an image on the basis of white light including red light, green light, and blue light emitted from the light source section 10. The image generation section 20 includes a casing 21 for the image generation section, and various optical systems are arranged inside this casing 21. Details of the various optical systems in the image generation section 20 will be described later with reference to FIG. 2.

The cooling section 50 is configured to generate a cooling wind for cooling the various optical systems in the image generation section 20. The cooling section 50 includes a sponge-type or charge-type filter 52, for example, for removing dust and a blower mechanism 51 that generates the cooling wind (e.g., axial flow fan and centrifugal fan). In this embodiment, the filter 52 is arranged along the inlet 3 at a position opposing the inlet 3 formed at the side surface portion of the exterior casing 1. Further, the blower mechanism 51 is arranged on a side of the filter 52. By driving this blower mechanism 51, external air sucked in from the inlet 3 is blown against the various optical systems in the image generation section 20 via the filter 52.

It should be noted that the projector 100 of this embodiment includes a duct (not shown) that guides the cooling wind generated by the blower mechanism 51 such that the cooling wind is blown against the various optical systems in the image generation section 20 from a lower side. In other words, in this embodiment, the cooling wind is blown against the various optical systems in the image generation section 20 from the lower side.

The projection section 60 projects light emitted from the image generation section 20 onto a screen. This projection section 60 includes a cylindrical body 61 that has a cylindrical shape and has a diameter on a front side larger than that on a rear side, and a plurality of lenses 62 (see FIG. 2) provided inside the cylindrical body 61.

In this embodiment, the projection section 60 is detachable (replaceable) from the projector 100. For example, the projection section 60 is replaced with other types of projection section 60 (e.g., projection section 60 that differs in lens type) as necessary. Alternatively, the projection section 60 is replace with a new projection section 60 of the same type when a failure occurs in the projection section 60.

On a front side of the casing 21 of the image generation section 20, a projection section holding portion 5 that detachably holds the projection section 60 is formed. There are a screw type, a magnet type, and the like as the mechanism for enabling the projection section 60 to become detachable, for example, but this mechanism is not limited in particular. In the projection section holding portion 5, an opening 6 (also see FIG. 4) for holding the projection section 60 is formed at a position corresponding to a position at which light from the image generation section 20 is emitted (position near center of projection section holding portion 5).

This opening 6 is formed circularly in correspondence with the shape of the projection section 60 and has a diameter slightly larger than that of the projection section 60 on a rear side. It should be noted that the size of this opening 6 is enough for at least a fingertip of the user to be inserted.

In this embodiment, in a state where the projection section 60 is held by the projection section holding portion 5, a part of the projection section 60 on the front side protrudes forwardly from the exterior casing 1. Moreover, in the state where the projection section 60 is held by the projection section holding portion 5, a part of the projection section 60 on the rear side protrudes from the rear of the projection section holding portion 5 such that that part enters the casing 21 for the image generation section (see FIG. 4).

[Configuration of Image Generation Section 20]

Figure 2:
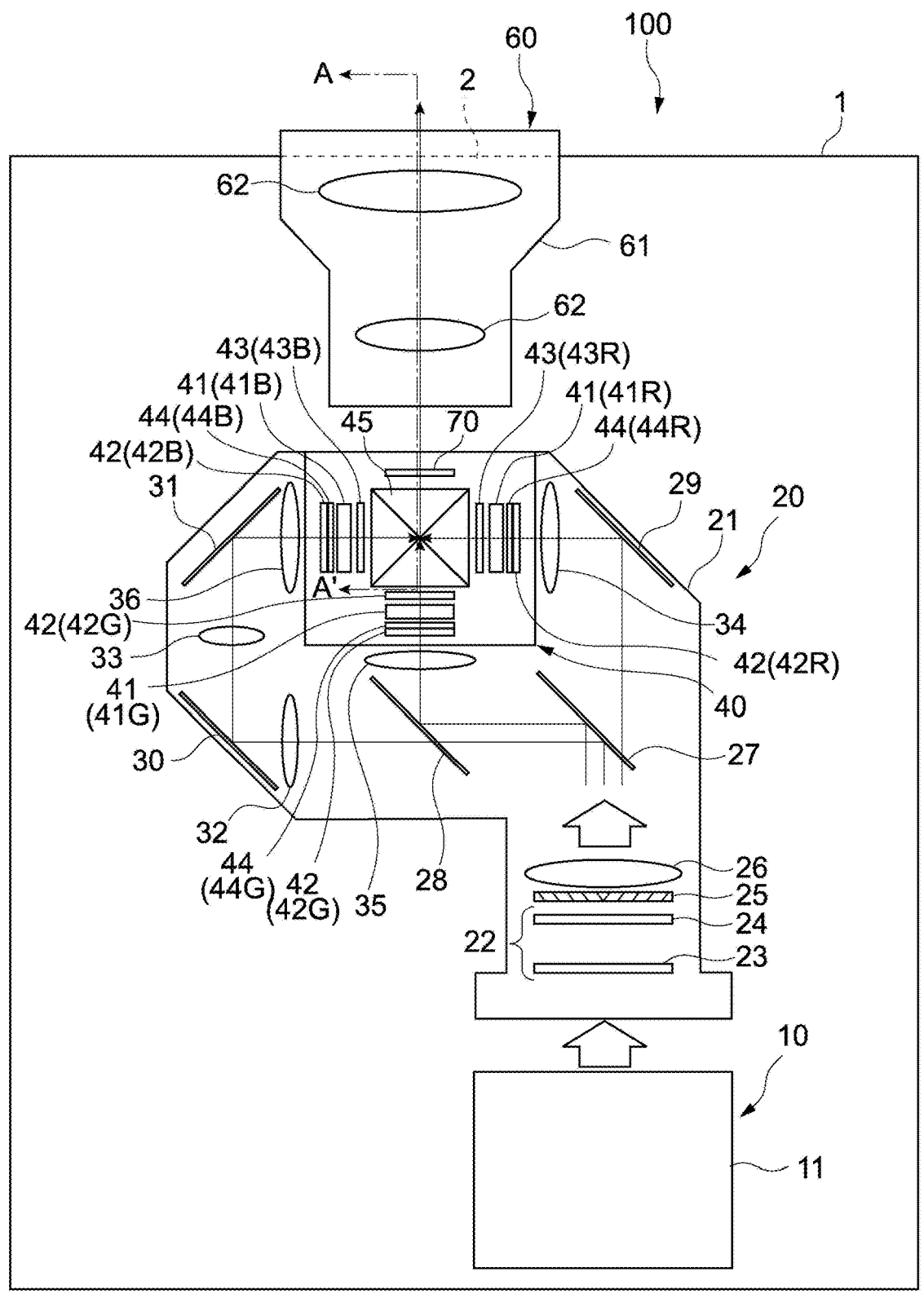
FIG. 2 A schematic top view of an image generation section of the projector.
Figure 3:
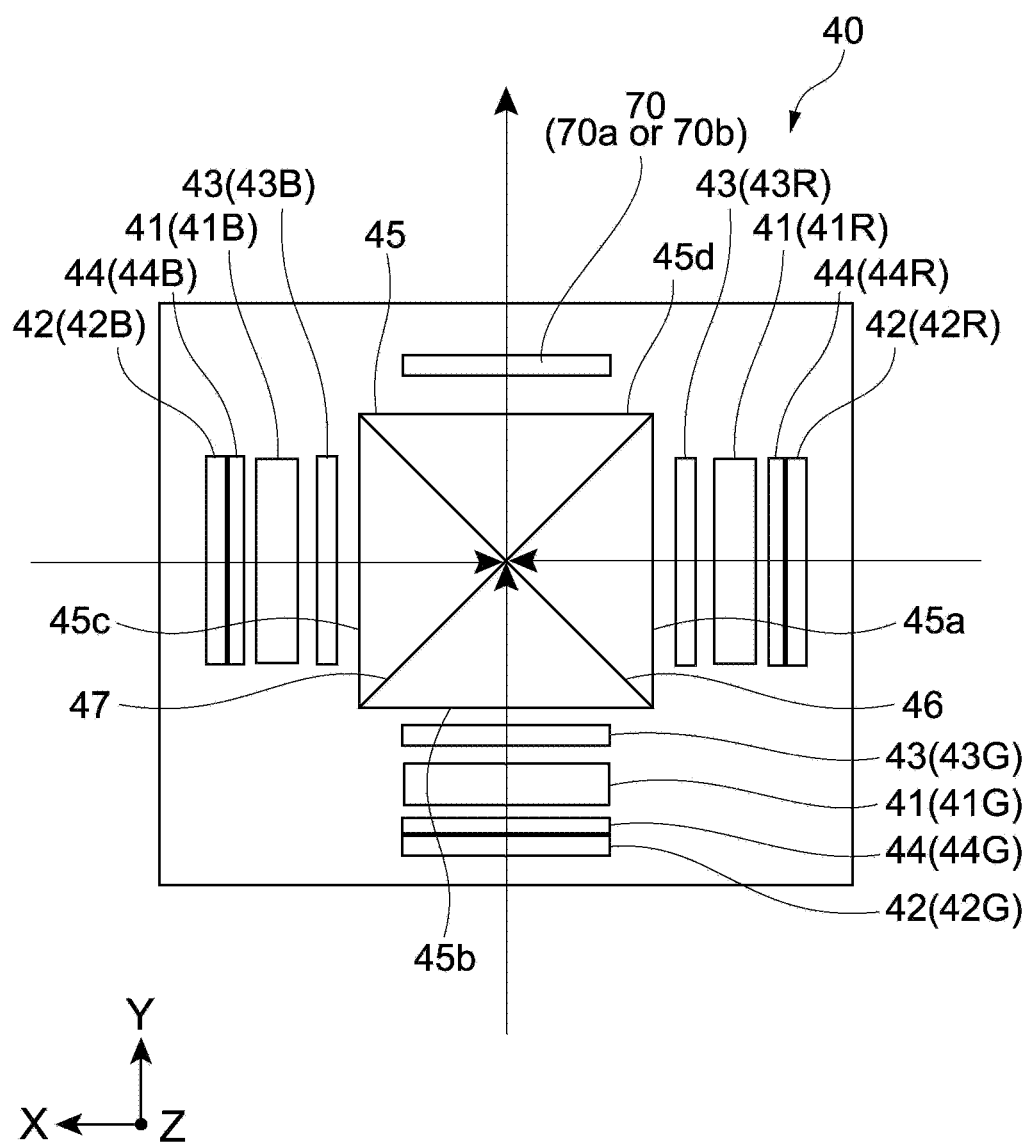
FIG. 3 A schematic top view of a part of the image generation section of the projector.

FIG. 2 is a schematic top view of the image generation section 20 of the projector 100. FIG. 3 is a schematic top view showing a part of the image generation section 20.

As shown in these figures, the image generation section 20 includes an integrator device 22, a polarization conversion plate 25, a collective lens 26, a first dichroic mirror 27, a second dichroic mirror 28, a first mirror 29, a second mirror 30, and a third mirror 31. The image generation section 20 also includes a first relay lens 32, a second relay lens 33, a first field lens 34, a second field lens 35, and a third field lens 36.

The image generation section 20 also includes a first liquid crystal lightbulb 41R, a second liquid crystal lightbulb 41G, a third liquid crystal lightbulb 41B, a first light-incident-side polarization plate 42R, a second light-incident-side polarization plate 42G, a third light-incident-side polarization plate 42B, a first light-emitting-side polarization plate 43R, a second light-emitting-side polarization plate 43G, and a third light-emitting-side polarization plate 43B. The image generation section 20 also includes a first polarization conversion plate 44R, a second polarization conversion plate 44G, a third polarization conversion plate 44B, and a cross dichroic prism 45.

The integrator device 22 adjusts incident light irradiated onto the polarization conversion plates 44 from the light source section 10 to have a uniform luminance distribution. The integrator device 22 includes a first fly eye lens 23 including a plurality of micro-lenses arranged two-dimensionally and a second fly eye lens 24 including a plurality of micro-lenses arranged so as to respectively correspond to those micro-lenses.

Parallel light that has entered the integrator device 22 from the light source section 10 is split into a plurality light fluxes by the micro-lenses of the first fly eye lens 23 and imaged on the corresponding micro-lenses of the second fly eye lens 24. The micro-lenses of the second fly eye lens 24 each function as a secondary light source and emit a plurality of parallel light beams having uniform luminance to the polarization conversion plate 25.

The polarization conversion plate 25 makes a polarization state of incident light that enters via the integrator device 22 uniform and emits the light to the collective lens 26. The collective lens 26 collects the incident light and emits it to the first dichroic mirror 27.

The first dichroic mirror 27 selectively transmits red light out of the incident white light and conversely, selectively reflects green and blue light. The second dichroic mirror 28 selectively transmits blue light out of the green and blue light reflected by the first dichroic mirror 27 and conversely, selectively reflects green light. In this way, the light emitted from the light source section 10 is split into red light, green light, and blue light.

The first mirror 29 reflects red light transmitted through the first dichroic mirror 27 and guides it to the first field lens 34 side. The first field lens 34 converts the incident red light into parallel light and emits it to the first light-incident-side polarization plate 42R.

Similarly, the second field lens 35 converts green light reflected by the second dichroic mirror 28 into parallel light and emits it to the second light-incident-side polarization plate 42G.

The second mirror 30 reflects blue light that has been transmitted through the second dichroic mirror 28 and passed the first relay lens 32 and guides it to the third mirror 31 side. The third mirror 31 reflects the blue light that has passed the second relay lens 33 and guides it to the third field lens 36 side. The third field lens 36 converts the blue light reflected by the third mirror 31 into parallel light and emits it to the third light-incident-side polarization plate 42B.

The first liquid crystal lightbulb 41R modulates red light, and the second liquid crystal lightbulb 41G modulates green light. Further, the third liquid crystal lightbulb 41B modulates blue light.

The first light-incident-side polarization plate 42R is arranged on a light-incident side of the first liquid crystal lightbulb 41R that modulates red light (light of first wavelength band), and the first light-emitting-side polarization plate 43R is arranged on a light-emitting side of the first liquid crystal lightbulb 41R. The second light-incident-side polarization plate 42G is arranged on a light-incident side of the second liquid crystal lightbulb 41G that modulates green light (light of second wavelength band), and the second light-emitting-side polarization plate 43G is arranged on a light-emitting side of the second liquid crystal lightbulb 41G. Further, the third light-incident-side polarization plate 42B is arranged on a light-incident side of the third liquid crystal lightbulb 41B that modulates blue light (light of third wavelength band), and the third light-emitting-side polarization plate 43B is arranged on a light-emitting side of the third liquid crystal lightbulb 41B. In other words, the light-incident-side polarization plates 42 and the light-emitting-side polarization plates 43 are arranged so as to respectively sandwich the liquid crystal lightbulbs 41.

Furthermore, in this embodiment, the first polarization conversion plate 44R (e.g., ½λ plate) is arranged at a position on the light-emitting surface side of the first light-incident-side polarization plate 42R. Similarly, the second polarization conversion plate 44G (e.g., ½λ plate) is arranged at a position on the light-emitting surface side of the second light-incident-side polarization plate 42G, and the third polarization conversion plate 44B (e.g., ½λ plate) is arranged at a position on the light-emitting surface side of the third light-incident-side polarization plate 42B.

It should be noted that the reason why these polarization conversion plates are provided and more detailed configurations of the light-incident-side polarization plates 42 and the light-emitting-side polarization plates 43 will be described later in detail with reference to FIG. 9.

The first light-incident-side polarization plate 42R aligns the polarization state of the red light converted into parallel light by the first field lens 34 and emits the light. The first polarization conversion plate 44R causes a polarization direction of the red light having an aligned polarization direction to rotate 90° about an optical axis and emits the light to the first liquid crystal lightbulb 41R. The first liquid crystal lightbulb 41R modulates incident light for each pixel on the basis of supplied image information to generate a red-color image, and emits the image to the first light-emitting-side polarization plate 43R. The first light-emitting-side polarization plate 43R aligns the polarization direction of the incident red light and emits the light to the cross dichroic prism 45.

The second light-incident-side polarization plate 42G aligns the polarization state of green light converted into parallel light by the second field lens 35 and emits the light. The second polarization conversion plate 44G causes a polarization direction of the green light having an aligned polarization direction to rotate 90° about the optical axis and emits the light to the second liquid crystal lightbulb 41G. The second liquid crystal lightbulb 41G modulates incident light for each pixel on the basis of the supplied image information to generate a green-color image, and emits the image to the second light-emitting-side polarization plate 43G. The second light-emitting-side polarization plate 43G aligns the polarization direction of the incident green light and emits the light to the cross dichroic prism 45.

The third light-incident-side polarization plate 42B aligns the polarization state of blue light converted into parallel light by the third field lens 36 and emits the light. The third polarization conversion plate 44B causes a polarization direction of the blue light having an aligned polarization direction to rotate 90° about the optical axis and emits the light to the third liquid crystal lightbulb 41B. The third liquid crystal lightbulb 41B modulates incident light for each pixel on the basis of the supplied image information to generate a blue-color image, and emits the image to the third light-emitting-side polarization plate 43B. The third light-emitting-side polarization plate 43B aligns the polarization direction of the incident blue light and emits the light to the cross dichroic prism 45.

The cross dichroic prism 45 superimposes and synthesizes the light of respective colors that has entered from three directions and emits the synthesized light toward the projection section 60. The cross dichroic prism 45 has a cuboid shape (cube shape) that is a quadrate when seen in a longitudinal direction.

The cross dichroic prism 45 includes a first side surface 45a that red light enters and opposes the first light-emitting-side polarization plate 43R, a second side surface 45b that green light enters and opposes the second light-emitting-side polarization plate 43G, and a third side surface 45c that blue light enters and opposes the third light-emitting-side polarization plate 43B. The cross dichroic prism 45 also includes a fourth side surface 45d (light-emitting surface) from which synthesis light of red light, green light, and blue light is emitted. The first side surface 45a and the third side surface 45c are side surfaces that oppose each other, and the second side surface 45b and the fourth side surface 45d are surfaces that oppose each other.

This cross dichroic prism 45 is formed as if 4 triangular prisms that are each an isosceles right triangle are bonded when seen in the longitudinal direction (one direction: Z-axis direction). At boundaries of the 4 triangular prisms, two dichroic films 46 and 47 are formed. The two dichroic films 46 and 47 form an X shape when seen in the longitudinal direction (one direction: Z-axis direction) and are formed such that an intersecting axis thereof extend in the longitudinal direction.

The first dichroic film 46 out of the two dichroic films 46 and 47 selectively transmits green light and blue light and conversely, selectively reflects red light. Meanwhile, the second dichroic film 47 selectively transmits green light and red light and conversely, selectively reflects blue light.

Therefore, red light that has its polarization state aligned by the first light-emitting-side polarization plate 43R and has entered the cross dichroic prism 45 from the first side surface 45a is reflected by the first dichroic film 46 and guided to the projection section 60 side. Further, green light that has its polarization state aligned by the second light-emitting-side polarization plate 43G and has entered the cross dichroic prism 45 from the second side surface 45b is transmitted through the first dichroic film 46 and the second dichroic film 47 and progresses straight to the projection section 60.

Further, blue light that has its polarization state aligned by the third light-emitting-side polarization plate 43B and has entered the cross dichroic prism 45 from the third side surface 45*c* is reflected by the second dichroic film 47 and guided to the projection section 60 side. Accordingly, synthesis light of the red light, green light, and blue light is generated, and this synthesis light is emitted from the fourth side surface 45*d*.

It should be noted that the 3 liquid crystal lightbulbs 41, the 3 light-incident-side polarization plates 42, the 3 light-emitting-side polarization plates 43, the 3 polarization conversion plates 44, and the cross dichroic prism 45 are formed as one optical unit 40.

[Transmissive Member 70]

On an optical path between the cross dichroic prism 45 and the projection section 60, a transmissive member 70 that transmits light is arranged. This transmissive member 70 includes a functional filter 70*a* or a substitute glass plate 70*b*. As the functional filter 70*a*, for example, a wavelength selectivity filter (e.g., color select etc.), a depolarization filter (e.g., crystal plate and phase difference film), a $\lambda/4$ plate, a color trimming filter, or the like is used.

The wavelength selectivity filter is used for the purpose of improving 3D luminance or eliminating screen unevenness in a case where ultrashort focal projection is carried out on a special screen, for example. Further, the depolarization filter and the $\lambda/4$ plate are used for the purpose of eliminating screen unevenness, and the color trimming filter is used for the purpose of enlarging a color range or performing 3D display by color separation, for example.

The substitute glass plate 70*b* is used in place of the functional filter 70*a* in a case where the functional filter 70*a* is not arranged on the optical path between the cross dichroic prism 45 and the projection section 60. Specifically, if nothing is arranged at the position of the functional filter 70*a* in a case where the functional filter 70*a* is not arranged, a back focal position is defocused, so the substitute glass plate 70*b* is arranged at that position in place of the functional filter.

The substitute glass plate 70*b* is formed of a low-cost material such as float glass, for example. Moreover, thicknesses of the functional filter 70*a* and the substitute glass plate 70*b* are set as appropriate on the basis of a filter refractive index so that optical lengths become the same.

It should be noted that at a shipment stage, the substitute glass plate 70*b* is provided on the optical path between the cross dichroic prism 45 and the projection section 60 as an initial setting. It should be noted that at the shipment stage, positioning of the liquid crystal lightbulbs 41 and the projection section 60 is carried out while the substitute glass plate 70*b* is provided on the optical path.

In a case where the user needs to extend functions, the inexpensive substitute glass plate 70*b* provided in the initial setting is removed as necessary so as to replace it with an arbitrary functional filter 70*a*.

[Replacement Mechanism]

In this embodiment, a replacement mechanism capable of replacing the transmissive member 70 is provided with respect to the projector 100 so that the user can easily replace the transmissive member 70 (functional filter 70*a* or substitute glass plate 70*b*).

Figure 4:
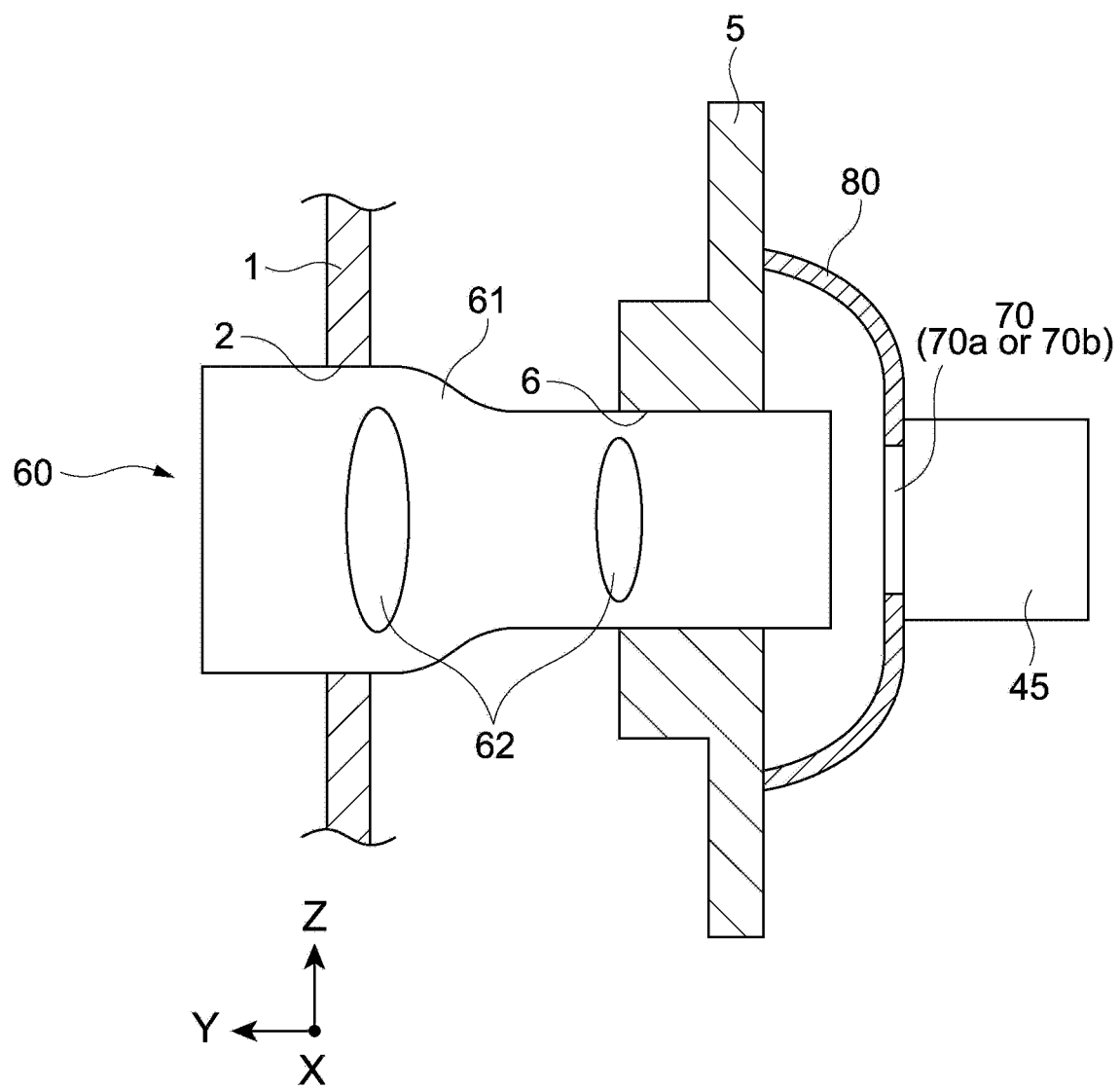
FIG. 4 A schematic side cross-sectional diagram taken along the line A-A' of FIG. 2.
Figure 5:
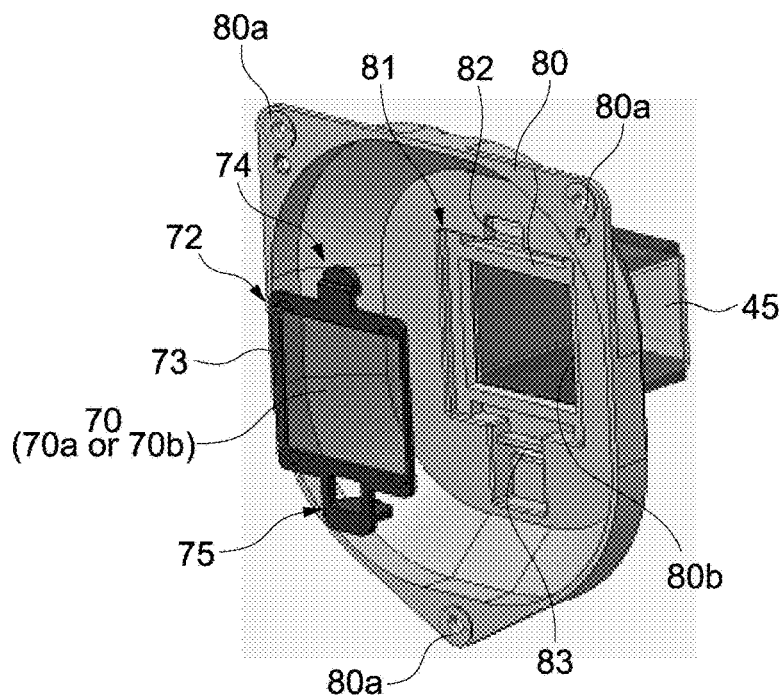
FIG. 5 A perspective view of a transmissive member holding portion and a transmissive member.
Figure 6:
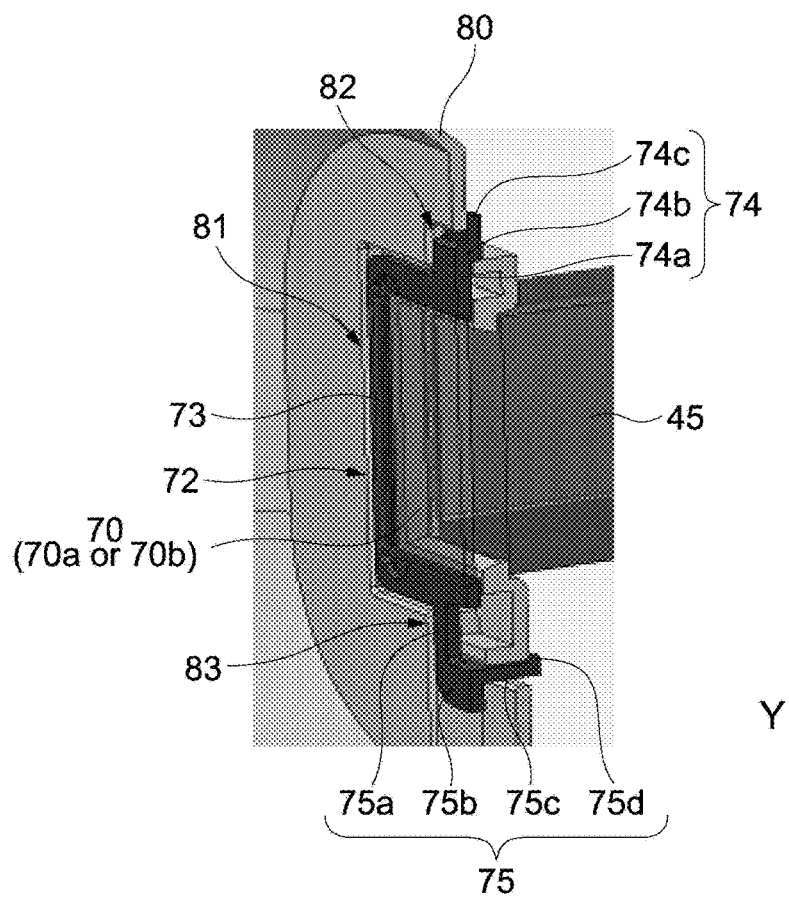
FIG. 6 A cross-sectional perspective view of the transmissive member holding portion and the transmissive member.
Figure 7:
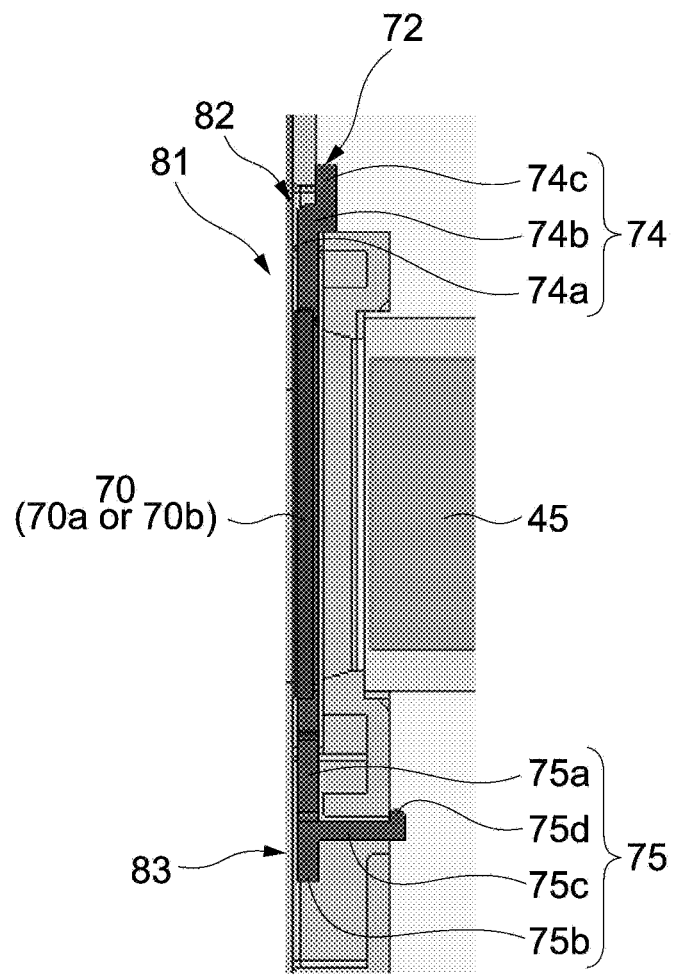
FIG. 7 A side cross-sectional diagram showing the transmissive member holding portion and the transmissive member.

FIG. 4 is a schematic side cross-sectional diagram taken along the line A-A' of FIG. 2. FIG. 5 is a perspective view of a transmissive member holding portion 80 and the transmissive member 70. FIG. 6 is a cross-sectional perspective view of the transmissive member holding portion 80 and the transmissive member 70. FIG. 7 is a side cross-sectional diagram showing the transmissive member holding portion 80 and the transmissive member 70.

As shown in the figures, the transmissive member holding portion 80 (example of replacement mechanism) capable of detachably holding the transmissive member 70 (holder 72) is provided on a back surface side of the projection section holding portion 5. The transmissive member holding portion 80 has a hemispherical shell shape (bowl shape) whose center portion is flat. A plurality of screw holes 80*a* are formed on the transmissive member holding portion 80, and by screwing screws in the screw holes 80*a*, the transmissive member holding portion 80 is attached to the back surface side of the projection section holding portion 5.

In the vicinity of the center of the transmissive member holding portion 80, an opening 80*b* that penetrates the transmissive member holding portion 80 in the front-back direction and is provided for transmitting light, is formed. A transmissive member attachment/detachment portion 81 that detachably holds the transmissive member 70 (holder 72) is formed at a position corresponding to this opening 80*b* on the front side of the transmissive member holding portion 80. The transmissive member attachment/detachment portion 81 includes a first engagement groove 82 formed above the opening 80*b* and a second engagement groove 83 formed below the opening 80*b*.

On the back surface side of the transmissive member holding portion 80, the cross dichroic prism 45 is fixedly attached at the position corresponding to the opening 80*b*. By being held by the transmissive member holding portion 80, the cross dichroic prism 45 is fixed at a predetermined position inside the casing 21 for the image generation section. In other words, the transmissive member holding portion 80 fixedly holds the cross dichroic prism 45 while detachably holding the transmissive member 70 (holder 72).

The transmissive member 70 is arranged at a position closer to the light-emitting surface 45*d* of the cross dichroic prism 45 than the light-incident surface of the projection section 60 while being attached to the transmissive member attachment/detachment portion 81 (transmissive member holding portion 80). Moreover, the transmissive member 70 (holder 72) is held by the transmissive member attachment/detachment portion 81 (transmissive member holding portion 80) so as to cover the opening 80*b*.

The transmissive member 70 (functional filter 70*a* or substitute glass plate 70*b*) is held by the holder 72. The holder 72 includes a rectangular frame body 73, a first engagement portion 74 formed on an upper end portion side of the frame body 73, and a second engagement portion 75 formed on a lower end portion side of the frame body 73. The first engagement portion 74 engages with the first engagement groove 82, and the second engagement portion 75 engages with the second engagement groove 83 via a claw portion 75*d* (bias portion).

The first engagement portion 74 includes a first portion 74*a* that protrudes upwardly from a position at substantially a center of an upper end portion of the frame body 73, a second portion 74*b* that protrudes backwardly from an upper end portion of the first portion 74*a*, and a third portion 74*c* that protrudes upwardly from a rear end portion of the second portion 74*b*.

The second engagement portion 75 includes two first portions 75*a* that protrude downwardly while being parallel to each other from a position in the vicinity of a center of a lower end portion of the frame body 73, and a second portion 75*b* that connects lower end portions of the two first portions 75*a*. The second engagement portion 75 also includes a lingulate third portion 75*c* that protrudes backwardly from the second portion 74*b* at the upper end portion of the second portion 75*b*, and a fourth portion 75*d* (claw portion: bias portion) that protrudes upwardly from the third portion 74c on the rear side of the third portion 75c.

It should be noted that the first engagement portion 74 is a portion that becomes a fulcrum when attaching/detaching the transmissive member 70 (holder 72). On the other hand, the second engagement portion 75 is a portion used for switching between fix and release when attaching/detaching the transmissive member 70 (holder 72).

Specifically, by the fourth portion 75d (claw portion) of the second engagement portion 75 being biased upwardly and coming around on a back surface side of the transmissive member holding portion 80, the transmissive member 70 (holder 72) is fixed to the transmissive member attachment/detachment portion 81. On the other hand, as the lower end portion of the second portion 74b of the second engagement portion 75 is moved forwardly, the fixed state of the fourth portion 75d (claw portion) of the second engagement portion 75 is released. Accordingly, the transmissive member 70 (holder 72) becomes detachable from the transmissive member attachment/detachment portion 81.

[Operations Carried Out When Replacing Transmissive Member 70 (Holder 72)]

Next, operations carried out when the user replaces the functional filter 70a and the substitute glass plate 70b will be described. In descriptions herein, it is assumed that the substitute glass plate 70b is provided in the projector 100. It should be noted that as described above, in the shipment stage, the substitute glass plate 70b is attached on the optical path between the cross dichroic prism 45 and the projection section 60.

Figure 8:
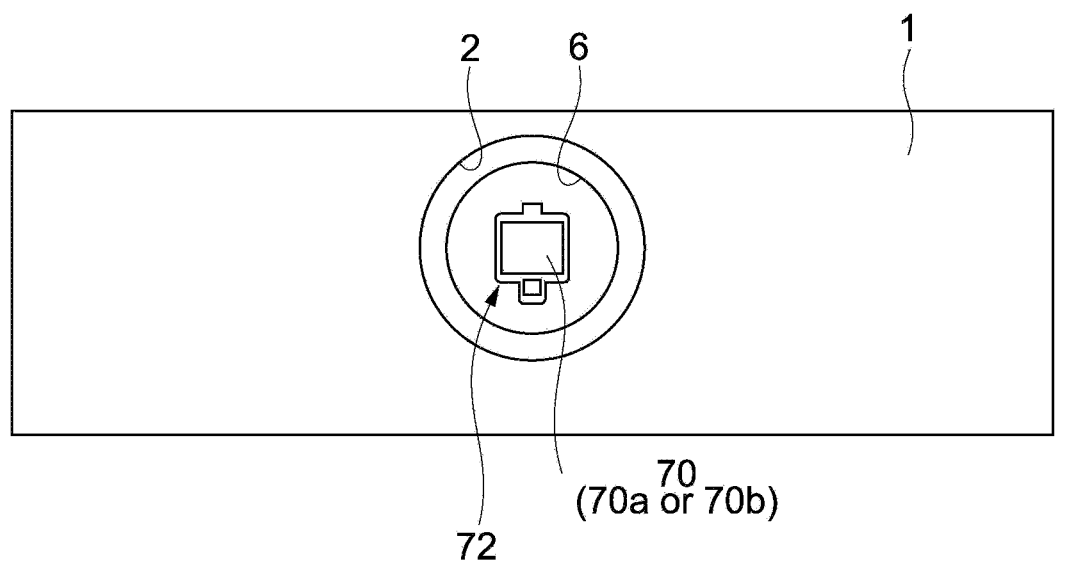
FIG. 8 A schematic front view showing a state where a projection section is removed.

In a case where there is a need to extend functions, the user first removes the projection section 60 from the projection section holding portion 5. FIG. 8 is a schematic front view showing a state where the projection section 60 is removed. As shown in FIG. 8, as the projection section 60 is removed from the projection section holding portion 5, the substitute glass plate 70b becomes exposed via the opening 2 of the exterior casing 1 and the opening 6 of the projection section holding portion 5.

Next, the user inserts his/her fingertip into the opening 2 of the exterior casing 1 and the opening 6 of the projection section holding portion 5 and removes the substitute glass plate 70b from the transmissive member attachment/detachment portion 81. It should be noted that since the opening 2 of the exterior casing 1 and the opening 6 of the projection section holding portion 5 are each of a size enough for the fingertip of the user to be inserted as described above, the user can easily insert his/her fingertip into the openings 2 and 6.

In removing the substitute glass plate 70b, the user pinches the lower end portion of the second portion 74b of the second engagement portion 75 in the holder 72 and moves it forwardly. As a result, the fixed state of the fourth portion 75d (claw portion) of the second engagement portion 75 is released. As the user moves the lower end portion of the second portion 74b of the second engagement portion 75 more to the front, the holder 72 (substitute glass plate 70b) rotates with the first engagement portion 74 being a fulcrum, and the holder 72 (substitute glass plate 70b) is removed from the transmissive member attachment/detachment portion 81.

Next, the user holds an arbitrary functional filter 70a, inserts his/her fingertip into the opening 2 of the exterior casing 1 and the opening 6 of the projection section holding portion 5, and attaches the functional filter 70a to the transmissive member attachment/detachment portion 81. In attaching the functional filter 70a, the user first inserts the first engagement portion 74 of the holder 72 into the first engagement groove 82 of the transmissive member attachment/detachment portion 81. Next, the user rotates the holder 72 (functional filter 70a) using the first engagement portion 74 as a fulcrum and inserts the second engagement portion 75 of the holder 72 into the second engagement groove 83 of the transmissive member attachment/detachment portion 81.

As the second engagement portion 75 of the holder 72 is inserted into the second engagement groove 83 of the transmissive member attachment/detachment portion 81, the fourth portion 75d (claw portion) of the second engagement portion 75 comes around to the back surface side of the transmissive member holding portion 80 and is biased upwardly. Accordingly, the holder 72 (functional filter 70a) is fixed to the transmissive member attachment/detachment portion 81.

As the functional filter 70a is attached to the transmissive member attachment/detachment portion 81, the user next attaches the projection section 60 to the projection section holding portion 5. Accordingly, the functions of the projector 100 are extended.

In the descriptions herein, the operations carried out when replacing the substitute glass plate 70b with the functional filter 70a have been described. On the other hand, it is also possible for the functional filter 70a to be replaced with the substitute glass plate 70b or the functional filter 70a to be replaced with other types of functional filter 70a. It should be noted that operations therefor are similar to those described above, so descriptions thereof will be omitted.

[Operations etc. of Replacement Mechanism]

According to the projector 100 of this embodiment, the transmissive member 70 (functional filter 70a and substitute glass plate 70b) can be replaced as necessary. Moreover, since the transmissive member 70 is provided on the optical path between the cross dichroic prism 45 and the projection section 60 in the projector 100 of this embodiment, the transmissive member 70 can be made more compact than in a case where the transmissive member 70 is provided on the front side of the projection section 60. Accordingly, costs can be reduced.

Moreover, in this embodiment, the transmissive member 70 is arranged at a position closer to the light-emitting surface of the cross dichroic prism 45 than the light-incident surface of the projection section 60 while being attached to the transmissive member attachment/detachment portion 81. As a result, the transmissive member 70 can be made more compact. It should be noted that it is possible for the transmissive member 70 to become smaller as the position thereof approaches the light-emitting surface of the cross dichroic prism 45.

Further, in this embodiment, the transmissive member attachment/detachment portion 81 (transmissive member holding portion 80) is adopted as the replacement mechanism. Accordingly, the transmissive member 70 can be easily replaced by being attached/detached. Furthermore, in this embodiment, the first engagement groove 82 and the second engagement groove 83 are formed in the transmissive member attachment/detachment portion 81, and the first engagement portion 74 and the second engagement portion 75 are correspondingly formed in the holder 72 of the transmissive member 70.

Therefore, the user can easily replace the transmissive member 70 by the first engagement groove 82, the second engagement groove 83, the first engagement portion 74, and the second engagement portion 75. Particularly since the second engagement portion of the holder is configured to engage with the second engagement groove 83 via the claw portion 75d thereof in this embodiment, the user can replace the transmissive member 70 with more ease.

Further, in this embodiment, the transmissive member 70 is replaced via the opening 2 of the exterior casing 1 and the opening 6 of the projection section holding portion 5, that are formed during when the projection section 60 is removed from the projector 100. Therefore, the user does not need to disintegrate the projector 100 in replacing the transmissive member 70. Consequently, the user can easily replace the transmissive member 70.

It should be noted that in a case of a general projector 100, the projection section 60 is configured to be detachable in many cases. Therefore, there is no need to specially change the exterior casing 1 or the projection section holding portion 5 for enabling the transmissive member 70 to be replaced. In other words, members that are the same as those of an existing projector 100 can be used as the exterior casing 1 and the projection section holding portion 5.

Furthermore, in this embodiment, the transmissive member 70 (holder 72) is held by the transmissive member attachment/detachment portion 81 (transmissive member holding portion 80) so as to cover the opening 80b. By the transmissive member 70 (holder 72) covering the opening 80b in this way, it becomes possible to effectively prevent dust and the like from entering the optical path on an upstream side of the opening 80b.

Here, in a case where several functions obtained by the functional filter 70a are mounted on the projector 100, the functions are mounted also with respect to users that do not require those functions. As a result, costs of those functions may become a waste for the users. There is a fear that this may lead to lowering of sales. On the other hand, in a case of choosing the functions of the functional filter 70a, requests of a minority are disregarded. There is a fear that this also leads to lowering of sales.

On the other hand, in the projector 100 of this embodiment, the inexpensive substitute glass plate 70b is provided in the initial setting at the shipment stage of the projector 100. In addition, in a case where functions need to be extended, the substitute glass plate 70b is replaced with the functional filter 70a as necessary.

Therefore, in the projector 100 of this embodiment, it becomes possible to prevent useless costs from being topped on with respect to the users who do not require such functions. Moreover, since the functional filter 70a can be attached to the projector 100 of this embodiment as necessary, it becomes possible to appropriately cope with the requests of a minority. In other words, in this embodiment, it is possible to appropriately provide functions obtained by the functional filter 70a to the users who need those functions while providing the projector 100 which is inexpensive in the initial setting. It is considered that this leads to an increase of sales.

Here, as a comparative example, a case where the functional filter 70a is adhered onto the light-emitting surface 45d of the cross dichroic prism 45 will be discussed. In this case, if the functional filter 70a is to be replaced, there is a need to replace the entire optical unit 40 including the cross dichroic prism 45. In this case, the replacement is difficult for the final consumer him/herself. On the other hand, while the serviceman is capable of replacing the entire optical unit 40, there is a need to perform a position adjustment of the liquid crystal lightbulbs 41, which may lead to an increase in processing costs.

On the other hand, since the transmissive member 70 (holder 72) is detachable from the transmissive member attachment/detachment portion 81 of the transmissive member holding portion 80 in this embodiment, there is no need to replace the entire optical unit 40 including the cross dichroic prism 45. As a result, it also becomes possible for the final consumer to easily replace the transmissive member 70 and also prevent processing costs by the serviceman from increasing.

In the descriptions above, the position where the transmissive member 70 is arranged is described as being on the optical path between the cross dichroic prism 45 and the projection section 60. However, the position where the transmissive member 70 is arranged may be on an optical path between the liquid crystal lightbulbs 41 and the cross dichroic prism 45. Typically, the position where the transmissive member 70 is arranged may be anywhere on the optical path between the liquid crystal lightbulb 41 and the projection section 60.

It should be noted that if the transmissive member 70 is arranged on the optical path between the liquid crystal lightbulb 41 and the projection section 60, it becomes possible to miniaturize the transmissive member 70 while causing the functional filter 70a to function effectively.

In the descriptions above, the case where the lightbulb is the transmissive-type liquid crystal lightbulb 41 has been described. On the other hand, the lightbulb may be a reflection-type liquid crystal lightbulb or a DLP (registered trademark) (Digital Light Processing). Also in the case where the lightbulb is a reflection-type liquid crystal lightbulb or a DLP, the position where the transmissive member 70 is arranged is on the optical path between the lightbulb and the projection section 60.

In the descriptions above, the case where the replacement mechanism is of a removable type has been described. On the other hand, the replacement mechanism may also be of a screw type or a magnetic type. Alternatively, the replacement mechanism may be a revolver type or a shutter type.

In the case of the revolver type, a plurality of transmissive members 70 of different types are arranged along a circumferential direction of a disk-like revolver. Then, as the revolver is rotated, the transmissive member 70 arranged on the optical path between the lightbulb and the projection section 60 is switched sequentially.

In the case of the shutter type, for example, the plurality of transmissive members 70 of different types are arranged in a longitudinal direction of a shutter elongated in one direction. Then, as the shutter is moved in the one direction, the transmissive member 70 on the optical path between the lightbulb and the projection section 60 is switched sequentially.

In the descriptions above, the transmissive member 70 has been described as being replaced via the opening 2 of the exterior casing 1 and the opening 6 of the projection section holding portion 5. On the other hand, a slot into which the transmissive member 70 can be inserted may be formed on each of an upper surface of the exterior casing 1 and an upper surface of the casing 21 of the image generation section 20. In this case, the transmissive member 70 is replaced via these slots.

This type is particularly effective in a case where the transmissive member 70 is arranged at an unreachable position even when the projection section 60 is removed (e.g., between liquid crystal lightbulb 41 and cross dichroic prism 45), for example.

[Relationship Between Light-Incident-Side Polarization Plate 42/Light-Emitting-Side Polarization Plate 43 and Cooling Wind]

Next, a relationship between the light-incident-side polarization plate 42/light-emitting-side polarization plate 43 and the cooling wind will be described. FIG. 9 is a schematic perspective view for explaining the relationship between the light-incident-side polarization plate 42/light-emitting-side polarization plate 43 and the cooling wind.

Figure 9:
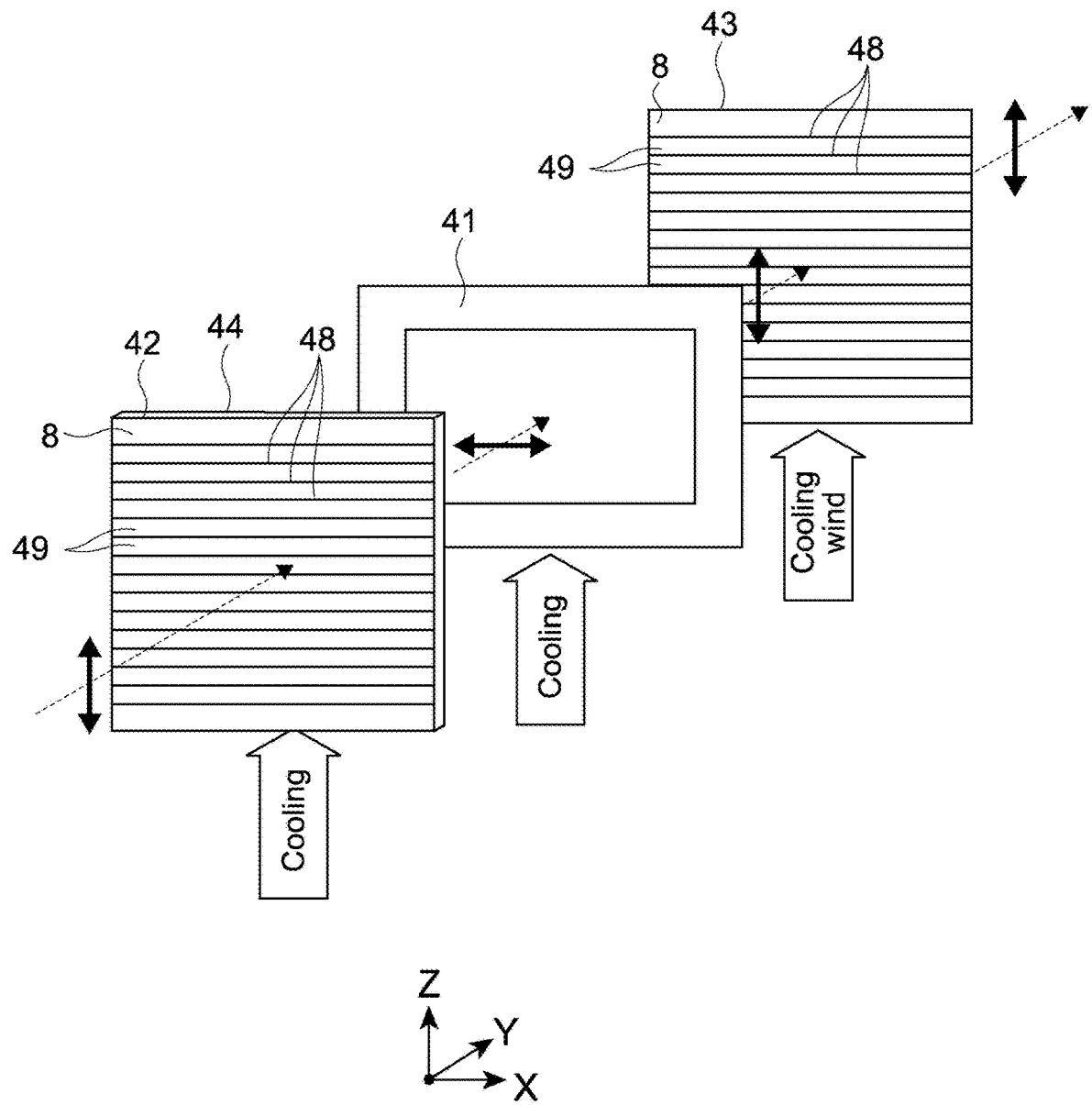
FIG. 9 A schematic perspective view for explaining a relationship between a light-incident-side polarization plate/light-emitting-side polarization plate and a cooling wind.

In descriptions on FIG. 9, it is assumed that an optical axis direction is a Y-axis direction, a horizontal direction vertical to the optical axis direction is an X-axis direction, and a longitudinal direction is a Z-axis direction. In addition, it is assumed that the upstream side of the optical path in FIG. 9 is the front side, and the downstream side of the optical path is the rear side (Y-axis direction).

In this embodiment, the light-incident-side polarization plate 42 and the light-emitting-side polarization plate 43 are each configured by a wire-grid-type inorganic polarization plate including a plurality of wires 48. It should be noted that the inorganic polarization plate includes characteristics of high heat resistance.

The light-incident-side polarization plate 42 and the light-emitting-side polarization plate 43 each include a substrate 8 configured by a transparent glass material or the like and the plurality of wires 48 configured by metal such as aluminum. The plurality of wires 48 are formed to extend in one direction on the substrate 8 while being arranged in a direction orthogonal to the one direction. Moreover, grooves 49 are formed among the adjacent wires 48. The plurality of wires 48 transmit light including a polarization direction vertical to the direction in which the wires 48 extend and meanwhile, reflect light including a polarization direction parallel to the direction in which the wires 48 extend.

In this embodiment, a side of the light-incident-side polarization plate 42 on which the wires 48 are provided is arranged on the front side. On the other hand, a side of the light-emitting-side polarization plate 43 on which the wires 48 are provided is arranged on the rear side. It should be noted that it is also possible for the side of the light-incident-side polarization plate 42 on which the wires 48 are provided to be arranged on the rear side. In addition, it is also possible for the side of the light-emitting-side polarization plate 43 on which the wires 48 are provided to be arranged on the front side.

Further, in this embodiment, the light-incident-side polarization plate 42 is a reflection-type polarization plate, and meanwhile, the light-emitting-side polarization plate 43 is an absorption-type polarization plate. Therefore, an absorption layer (not shown) for absorbing unnecessary light is formed on the substrate 8 of the light-emitting-side polarization plate 43. By providing this absorption layer, it becomes possible to prevent unnecessary light from returning to the liquid crystal lightbulb 41 side to cause image deterioration.

It should be noted that it is also possible to use the absorption-type polarization plate for the light-incident-side polarization plate 42 and use the reflection-type polarization plate for the light-emitting-side polarization plate 43.

Furthermore, in this embodiment, the polarization conversion plate 44 (e.g., ½λ plate) is adhered onto the light-emitting surface of the light-incident-side polarization plate 42. This polarization conversion plate 44 causes a polarization direction of transmitted light to rotate 90° about the optical axis.

As shown in FIG. 9, in this embodiment, the cooling wind generated by the blower mechanism 51 is blown against the light-incident-side polarization plate 42, the liquid crystal lightbulb 41, and the light-emitting-side polarization plate 43 from the lower side (Z-axis direction).

Further, the direction in which the plurality of wires 48 extend on the light-incident-side polarization plate 42 is a direction orthogonal to the direction in which the cooling wind is blown (Z-axis direction) (X-axis direction). Similarly, the direction in which the plurality of wires 48 extend on the light-emitting-side polarization plate 43 is a direction orthogonal to the direction in which the cooling wind is blown (Z-axis direction) (X-axis direction). In other words, in this embodiment, the direction in which the plurality of wires 48 extend on the light-incident-side polarization plate 42 and the direction in which the plurality of wires 48 extend on the light-incident-side polarization plate 42 are the same, and this direction is a direction orthogonal to the cooling wind.

By causing the plurality of wires 48 of the light-incident-side polarization plate 42 and the light-emitting-side polarization plate 43 to extend in the direction orthogonal to the cooling wind in this way, it becomes possible to prevent moistures and contaminants (dust, oil, PM2.5, etc.) from entering the grooves 49 among the plurality of wires 48.

Here, operations of light will be described. Of light that enters the light-incident-side polarization plate 42, light that includes a polarization direction vertical to the direction in which the plurality of wires 48 extend on the light-incident-side polarization plate 42 (Z-axis direction) is transmitted through the light-incident-side polarization plate 42. On the other hand, light that includes a polarization direction parallel to the direction in which the plurality of wires 48 extend on the light-incident-side polarization plate 42 (X-axis direction) is reflected by the light-incident-side polarization plate 42.

The light that has transmitted through the light-incident-side polarization plate 42 is rotated 90° about the optical axis by the polarization conversion plate 44 so that its polarization direction is converted into the X-axis direction. Then, the light having a polarization direction in the X-axis direction enters the liquid crystal lightbulb 41 to be modulated. Of the light modulated by the liquid crystal lightbulb 41, light including a polarization direction vertical to the direction in which the plurality of wires 48 extend on the light-emitting-side polarization plate 43 (Z-axis direction) is transmitted through the light-emitting-side polarization plate 43. On the other hand, light that includes a polarization direction parallel to the direction in which the plurality of wires 48 extend on the light-emitting-side polarization plate 43 (X-axis direction) is reflected by the plurality of wires 48 of the light-emitting-side polarization plate 43 and absorbed by the absorption layer of the light-emitting-side polarization plate 43.

[Operations etc.]

Figure 10:
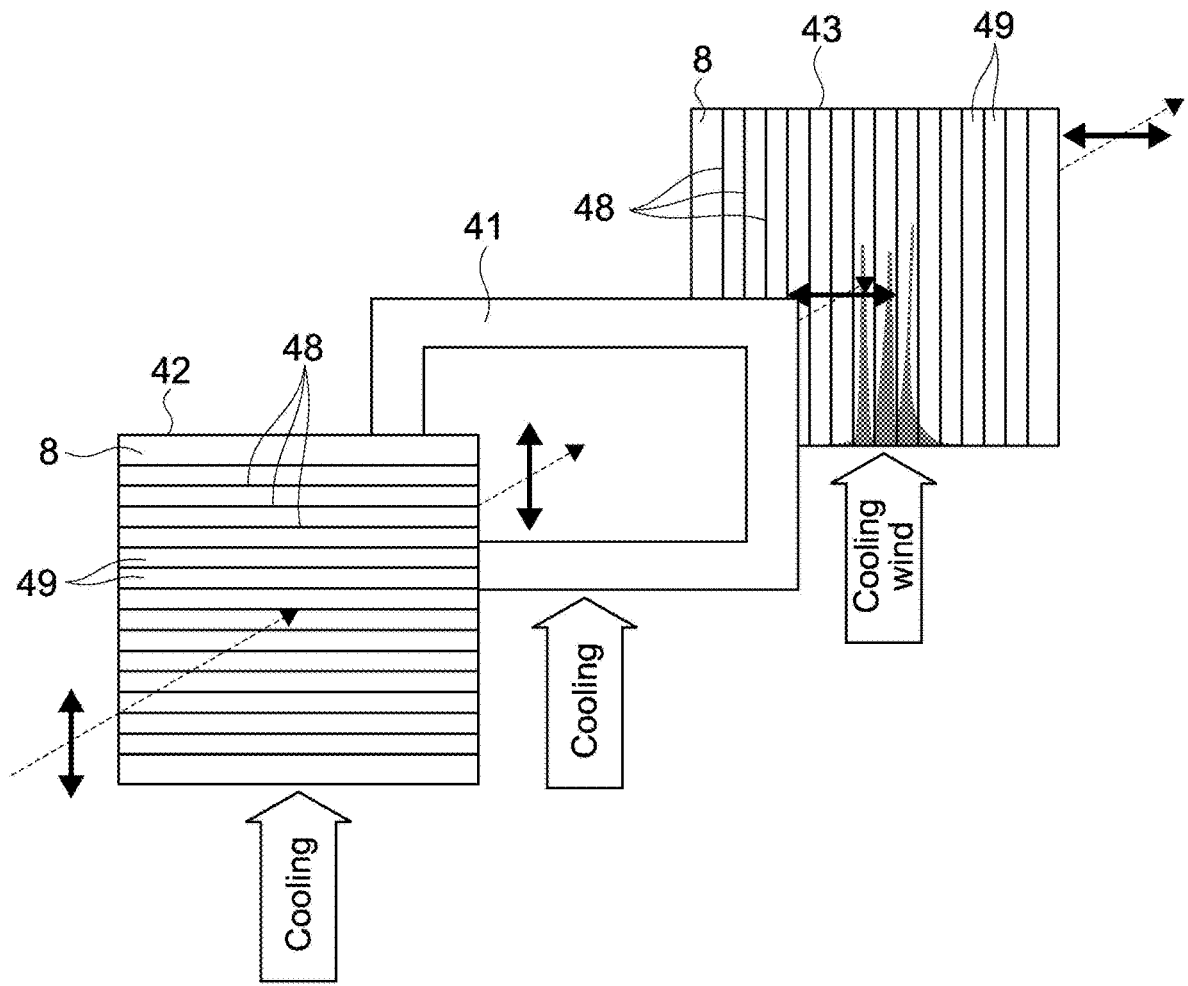
FIG. 10 A schematic perspective view for explaining a relationship between a light-incident-side polarization plate/light-emitting-side polarization plate and a cooling wind as a comparative example.

Here, operations of the projector 100 of this embodiment will be described. In descriptions herein, a comparative example will first be described. FIG. 10 is a schematic perspective view for explaining the relationship between the light-incident-side polarization plate 42/light-emitting-side polarization plate 43 and the cooling wind according to the comparative example.

In the comparative example shown in FIG. 10, unlike this embodiment, the direction in which the plurality of wires 48 extend on the light-emitting-side polarization plate 43 is a direction parallel to the cooling wind (Z-axis direction). In addition, in the comparative example, the polarization conversion plate 44 is not provided unlike this embodiment. Other points are similar to those of this embodiment.

In the comparative example shown in FIG. 10, of light that enters the light-incident-side polarization plate 42, light including a polarization direction vertical to the direction in which the plurality of wires 48 extend on the light-incident-side polarization plate 42 (Z-axis direction) is transmitted through the light-incident-side polarization plate 42. On the other hand, light including a polarization direction parallel to the direction in which the plurality of wires 48 extend on the light-incident-side polarization plate 42 (X-axis direction) is reflected by the light-incident-side polarization plate 42.

The light that has transmitted through the light-incident-side polarization plate 42 and has a polarization direction in the Z-axis direction enters the liquid crystal lightbulb 41 to be modulated. Of the light modulated by the liquid crystal lightbulb 41, light including a polarization direction vertical to the direction in which the plurality of wires 48 extend on the light-emitting-side polarization plate 43 (X-axis direction) is transmitted through the light-emitting-side polarization plate 43. On the other hand, light that includes a polarization direction parallel to the direction in which the plurality of wires 48 extend on the light-emitting-side polarization plate 43 (Z-axis direction) is reflected by the plurality of wires 48 of the light-emitting-side polarization plate 43 and absorbed by the absorption layer of the light-emitting-side polarization plate 43.

In the comparative example shown in FIG. 10, since the direction in which the plurality of wires 48 extend on the light-emitting-side polarization plate 43 is the direction parallel to the cooling wind (Z-axis direction), dusts and foreign substances included in the cooling wind are deposited on the lower end surface of the light-emitting-side polarization plate 43. If a deposited material is formed on the lower end surface of the light-emitting-side polarization plate 43, moistures and contaminants in air are absorbed by this deposited material so that the moistures and contaminants enter the grooves 49 among the wires 48 due to a capillary action, to thus contaminate the light-emitting-side polarization plate 43. In this case, the light-emitting-side polarization plate 43 does not function effectively.

For preventing this, there is a case where a method of forming a cover wall by a UV adhesive material on the lower end surface of the light-emitting-side polarization plate 43 onto which the cooling wind is blown, is used. While it is possible to prevent external moistures and contaminants from entering by this method, since the cover wall is formed of a UV adhesive material, there is a problem that the UV adhesive material itself enters the grooves 49 among the wires 48.

Figure 11:
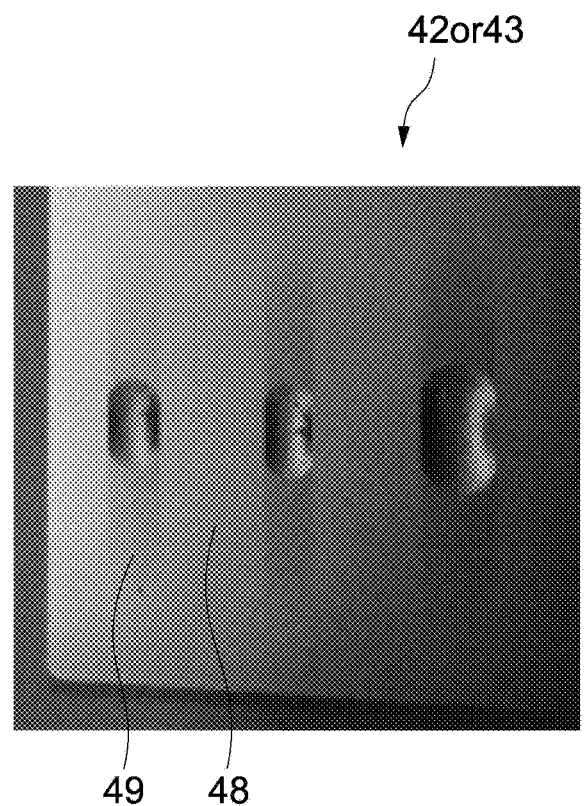
FIG. 11 A diagram showing a state where a UV adhesive material has entered grooves among wires.

FIG. 11 shows a state where the UV adhesive material has entered the grooves 49 among the wires 48.

Figure 12:
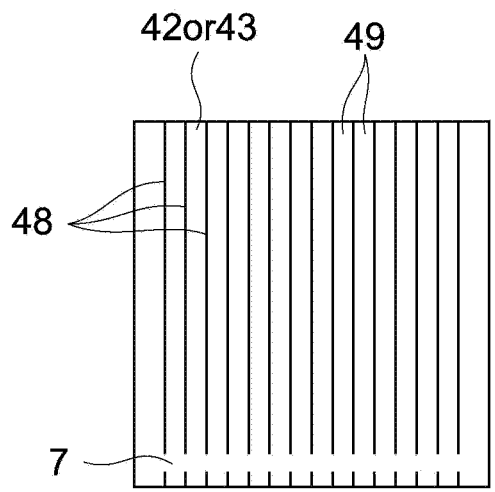
FIG. 12 A diagram showing a state where a scribe cut is formed on the light-emitting-side polarization plate.

Further, for preventing moistures and contaminants from entering, a method of forming a scribe cut 7 at a position about several mm above the lower end surface of the light-emitting-side polarization plate 43 onto which the cooling wind is blown in a direction orthogonal to the direction in which the plurality of wires 48 extend, is used in some cases. FIG. 12 shows a state where the scribe cut 7 is formed on the light-emitting-side polarization plate 43.

In this method, a space where the plurality of wires 48 do not exist (e.g., about 10 μm) is formed by the scribe cut 7, and this space prevents moistures and contaminants from entering the grooves 49. However, there is a problem that if moistures and contaminants enter the space formed by the scribe cut 7, the moistures and contaminants that have entered move upwardly again by the capillary action and enter the grooves 49.

In this regard, in the projector 100 of this embodiment, moistures and contaminants are prevented from entering the grooves 49 among the plurality of wires 48 by the method of causing the plurality of wires 48 of the light-incident-side polarization plate 42 and the light-emitting-side polarization plate 43 to extend in the direction orthogonal to the cooling wind.

In this embodiment, since the plurality of wires 48 of the light-incident-side polarization plate 42 and the light-emitting-side polarization plate 43 extend in the same direction, there is a need to insert a member for converting a polarization direction anywhere between the light-emitting surface of the light-incident-side polarization plate 42 and the light-incident surface of the light-emitting-side polarization plate 43. Therefore, in this embodiment, the polarization conversion plate 44 is adhered onto the light-emitting surface of the light-incident-side polarization plate 42. It should be noted that since the polarization conversion plate 44 is inexpensive, it does not lead to an increase in costs.

Here, the position where the polarization conversion plate 44 is inserted is not limited to the light-emitting surface of the light-incident-side polarization plate 42 as long as it is between the light-emitting surface of the light-incident-side polarization plate 42 and the light-incident surface of the light-emitting-side polarization plate 43. For example, the position where the polarization conversion plate 44 is inserted may be the light-incident surface of the liquid crystal lightbulb 41 or the light-emitting surface of the liquid crystal lightbulb 41. Alternatively, the position where the polarization conversion plate 44 is inserted may be the light-incident surface of the light-emitting-side polarization plate 43.

It should be noted that if the position where the polarization conversion plate 44 is inserted is the light-emitting surface of the light-incident-side polarization plate 42 and the light-incident surface of the liquid crystal lightbulb 41, focus deterioration can be prevented from occurring. Further, if the position where the polarization conversion plate 44 is inserted is the light-emitting surface of the light-incident-side polarization plate 42, the polarization conversion plate 44 can be prevented from being exposed to high temperature (because liquid crystal lightbulb 41 and light-emitting-side polarization plate 43 are members that are apt to become high in temperature).

Here, in this embodiment, the light-incident-side polarization plate 42 and the light-emitting-side polarization plate 43 can be configured by members having the same shape. Hereinafter, this will be described. The light-incident-side polarization plate 42 and the light-emitting-side polarization plate 43 normally have a rectangular shape that is long in the horizontal direction (X-axis direction) when seen in the optical axis direction and short in the vertical direction (Z-axis direction).

With reference to the comparative example shown in FIG. 10, in the comparative example, two types of polarization plate are necessary as the light-incident-side polarization plate 42 and the light-emitting-side polarization plate 43, in accordance with the extension directions of the wires 48. In other words, in the comparative example, a polarization plate on which the plurality of wires 48 are formed along a direction of long sides (X axis) needs to be prepared as the light-incident-side polarization plate 42. Further, in the comparative example, a polarization plate on which the plurality of wires 48 are formed along a direction of short sides (Z axis) needs to be prepared as the light-emitting-side polarization plate 43.

On the other hand, in this embodiment shown in FIG. 9, the polarization plate on which the plurality of wires 48 are formed along the direction of long sides (short sides are also possible) can be used commonly for the light-incident-side polarization plate 42 and the light-emitting-side polarization plate 43. This is because in this embodiment, the directions in which the wires extend are the same for the light-incident-side polarization plate 42 and the light-emitting-side polarization plate 43. Accordingly, in this embodiment, the light-incident-side polarization plate 42 and the light-emitting-side polarization plate 4 can be mass-produced with ease, and costs can be reduced. It also becomes possible to prevent the light-incident-side polarization plate 42 and the light-emitting-side polarization plate 43 from being attached mistakingly.

In the descriptions above, the direction in which the cooling wind is blown is the longitudinal direction, and the direction in which the plurality of wires 48 extend is the horizontal direction. On the other hand, the direction in which the cooling wind is blown may be the horizontal direction, and the direction in which the plurality of wires 48 extend may be the vertical direction.

The descriptions above have been given on the case where the direction in which the plurality of wires 48 of the light-incident-side polarization plate 42 and the light-emitting-side polarization plate 43 extend is the direction orthogonal (90°) to the direction in which the cooling wind is blown. On the other hand, the direction in which the plurality of wires 48 of the light-incident-side polarization plate 42 and the light-emitting-side polarization plate 43 extend does not need to be the direction orthogonal to the direction in which the cooling wind is blown as long as it is non-parallel to the direction in which the cooling wind is blown. For example, the direction in which the plurality of wires 48 extend may be 45° with respect to the direction in which the cooling wind is blown (Z-axis direction).

The descriptions above have been given on the case where the direction in which the plurality of wires 48 extend on the light-incident-side polarization plate 42 and the direction in which the plurality of wires 48 extend on the light-emitting-side polarization plate 43 are the same. On the other hand, these directions do not necessarily need to be the same. For example, the directions in which the plurality of wires 48 extend on the light-incident-side polarization plate 42 and the light-emitting-side polarization plate 43 may respectively be 45° and 135° from the direction in which the cooling wind is blown (Z-axis direction). In this case, the directions in which the plurality of wires 48 extend on the light-incident-side polarization plate 42 and the light-emitting-side polarization plate 43 can be made non-parallel to the direction in which the cooling wind is blown without providing the polarization conversion plate 44.

The technology of making the plurality of wires 48 non-parallel to the cooling wind is also applicable to a case where the lightbulb is a reflection-type liquid crystal lightbulb 41.

[Configuration for Preventing Ghost]

Next, a configuration for preventing a ghost from being generated due to unnecessary light generated on the light-emitting side of the light-emitting-side polarization plate 43 will be described.

[Cause of Generation of Ghost]

Figure 13:
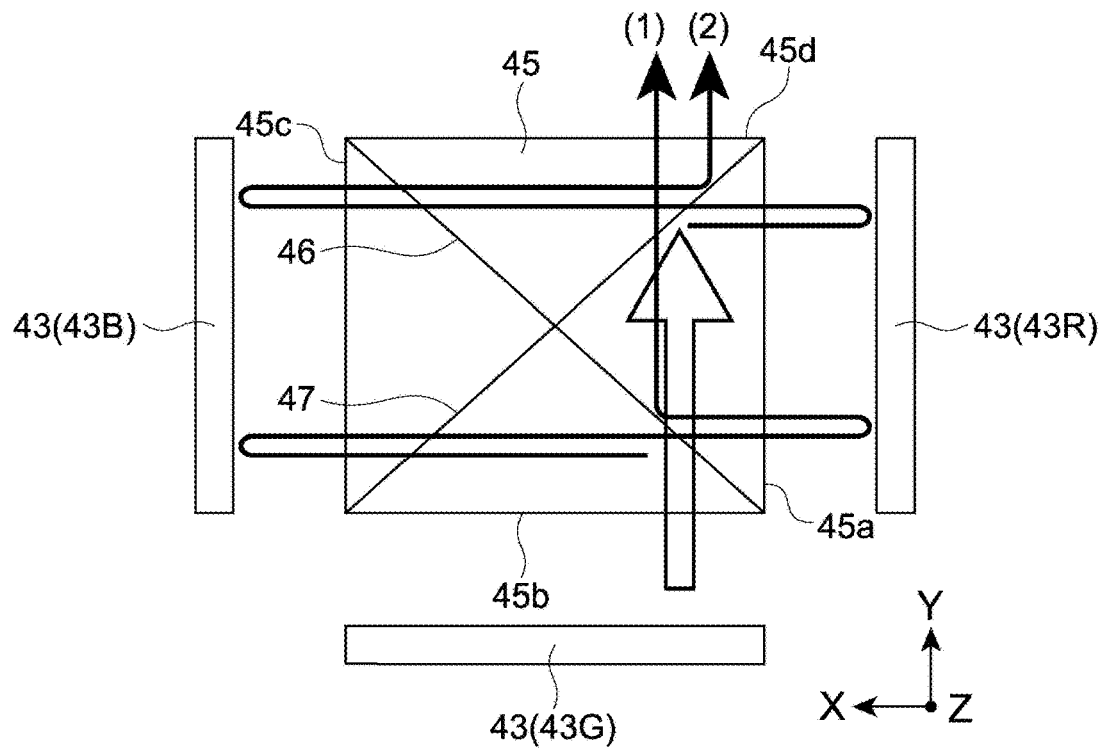
FIG. 13 A diagram for explaining why a ghost is generated.
Figure 14:
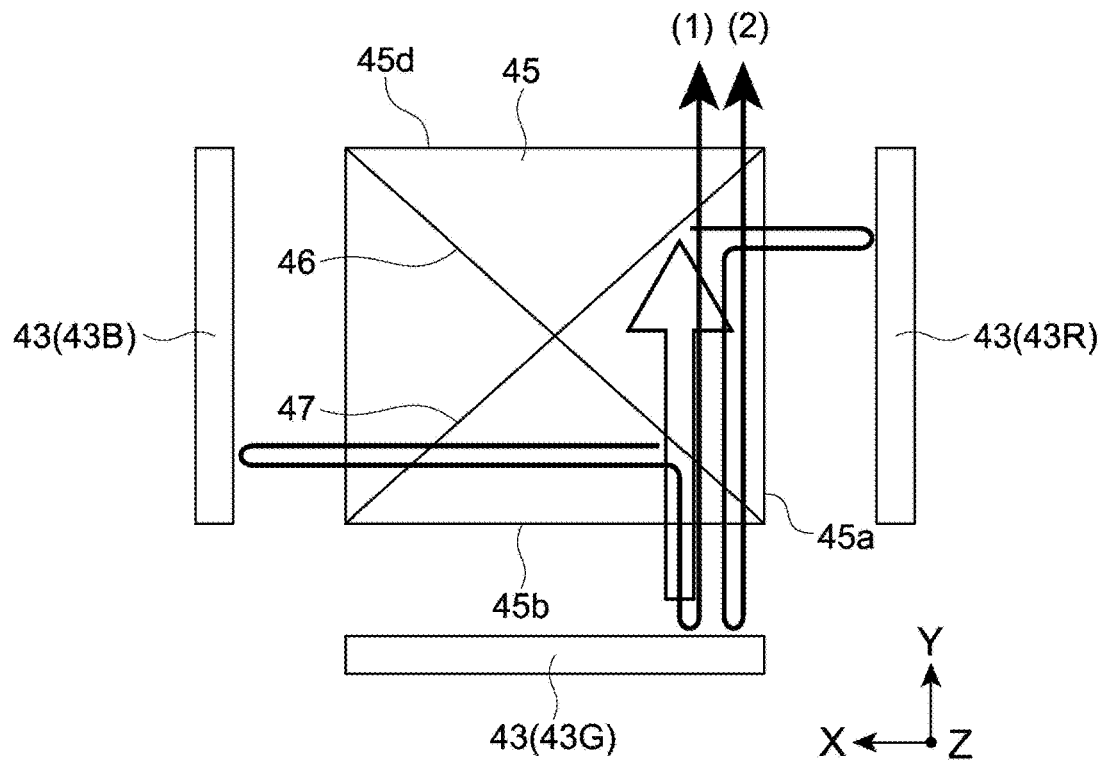
FIG. 14 A diagram for explaining why a ghost is generated.

In descriptions herein, the reason why a ghost is generated will first be described. FIGS. 13 and 14 are diagrams for explaining a cause of generation of a ghost.

First, a light movement (1) shown in FIG. 13 will be described. Green light (see white arrow) that is transmitted through the second light-emitting-side polarization plate 43G enters the cross dichroic prism 45 and then enters the first dichroic film 46. Although green light is originally transmitted through the first dichroic film 46 since the first dichroic film 46 transmits green light, partial light is reflected by the first dichroic film 46. The light reflected by the first dichroic film 46 is transmitted through the second dichroic film 47 and enters the light-emitting surface side of the third light-emitting-side polarization plate 43B.

The light that has entered the light-emitting surface side of the third light-emitting-side polarization plate 43B is reflected by the wires 48 formed on the light-emitting surface side of the third light-emitting-side polarization plate 43B and enters the cross dichroic prism 45 again. Then, this light is transmitted through the first dichroic film 46 after being transmitted through the second dichroic film 47 and enters the light-emitting surface side of the first light-emitting-side polarization plate 43R.

The light that has entered the light-emitting surface side of the first light-emitting-side polarization plate 43R is reflected by the wires 48 formed on the light-emitting surface side of the first light-emitting-side polarization plate 43R and enters the cross dichroic prism 45 again. This light enters the first dichroic film 46. Although green light is originally transmitted through the first dichroic film 46 since the first dichroic film 46 transmits green light, partial light is reflected by the first dichroic film 46. The light reflected by the first dichroic film 46 is transmitted through the second dichroic film 47 and is emitted from the light-emitting surface 45d of the cross dichroic prism 45. This light causes a ghost.

Next, a light movement (2) shown in FIG. 13 will be described. Green light (see white arrow) that is transmitted through the second light-emitting-side polarization plate 43G enters the cross dichroic prism 45, is transmitted through the first dichroic film 46, and then enters the second dichroic film 47. Although green light is originally transmitted through the second dichroic film 47 since the second dichroic film 47 transmits green light, partial light is reflected by the second dichroic film 47. The light reflected by the second dichroic film 47 enters the light-emitting surface side of the first light-emitting-side polarization plate 43R.

The light that has entered the light-emitting surface side of the first light-emitting-side polarization plate 43R is reflected by the wires 48 formed on the light-emitting surface side of the first light-emitting-side polarization plate 43R and enters the cross dichroic prism 45 again. Then, this light is transmitted through the first dichroic film 46 after being transmitted through the second dichroic film 47 and enters the light-emitting surface side of the third light-emitting-side polarization plate 43B.

The light that has entered the light-emitting surface side of the third light-emitting-side polarization plate 43B is reflected by the wires 48 formed on the light-emitting surface side of the third light-emitting-side polarization plate 43B and enters the cross dichroic prism 45 again. This light enters the second dichroic film 47 after being transmitted through the first dichroic film 46. Although green light is originally transmitted through the second dichroic film 47 since the second dichroic film 47 transmits green light, partial light is reflected by the second dichroic film 47. The light reflected by the second dichroic film 47 is emitted from the light-emitting surface 45d of the cross dichroic prism 45. This light causes a ghost.

Next, a light movement (1) shown in FIG. 14 will be described. Green light (see white arrow) that is transmitted through the second light-emitting-side polarization plate 43G enters the cross dichroic prism 45 and then enters the first dichroic film 46. Although green light is originally transmitted through the first dichroic film 46 since the first dichroic film 46 transmits green light, partial light is reflected by the first dichroic film 46. The light reflected by the first dichroic film 46 is transmitted through the second dichroic film 47 and enters the light-emitting surface side of the third light-emitting-side polarization plate 43B.

The light that has entered the light-emitting surface side of the third light-emitting-side polarization plate 43B is reflected by the wires 48 formed on the light-emitting surface side of the third light-emitting-side polarization plate 43B and enters the cross dichroic prism 45 again. Then, this light enters the first dichroic film 46 after being transmitted through the second dichroic film 47. Although green light is originally transmitted through the second dichroic film 47 since the first dichroic film 46 transmits green light, partial light is reflected by the first dichroic film 46.

The light reflected by the first dichroic film 46 enters the light-emitting surface side of the second light-emitting-side polarization plate 43G and is reflected by the wires 48 formed on the light-emitting surface side of the second light-emitting-side polarization plate 43G. This light is transmitted through the second dichroic film 47 after being transmitted through the first dichroic film 46 and is emitted from the light-emitting surface 45d of the cross dichroic prism 45. This light causes a ghost.

Next, a light movement (2) shown in FIG. 14 will be described. Green light (see white arrow) that is transmitted through the second light-emitting-side polarization plate 43G enters the cross dichroic prism 45. This light enters the second dichroic film 47 after being transmitted through the first dichroic film 46. Although green light is originally transmitted through the second dichroic film 47 since the second dichroic film 47 transmits green light, partial light is reflected by the second dichroic film 47. The light reflected by the second dichroic film 47 enters the light-emitting surface side of the first light-emitting-side polarization plate 43R.

The light that has entered the light-emitting surface side of the first light-emitting-side polarization plate 43R is reflected by the wires 48 formed on the light-emitting surface side of the first light-emitting-side polarization plate 43R, enters the cross dichroic prism 45 again, and then enters the second dichroic film 47. Although green light is originally transmitted through the second dichroic film 47 since the second dichroic film 47 transmits green light, partial light is reflected by the second dichroic film 47.

The light reflected by the second dichroic film 47 is transmitted through the first dichroic film 46 and enters the light-emitting surface side of the second light-emitting-side polarization plate 43G. The light that has entered the light-emitting surface side of the second light-emitting-side polarization plate 43G is reflected by the wires 48 formed on the light-emitting surface side of the second light-emitting-side polarization plate 43G. This light is transmitted through the second dichroic film 47 after being transmitted through the first dichroic film 46 and is emitted from the light-emitting surface 45d of the cross dichroic prism 45. This light causes a ghost.

Although the descriptions on FIGS. 13 and 14 have been given on green light, red light and blue light may similarly cause ghosts.

[Specific Configuration of Light-Emitting-Side Polarization Plate 43]

For preventing a ghost due to unnecessary light as shown in FIGS. 13 and 14, in the projector 100 of this embodiment, at least one light-emitting-side polarization plate 43 out of the first light-emitting-side polarization plate 43R, the second light-emitting-side polarization plate 43G, and the third light-emitting-side polarization plate 43B is tilted with respect to the opposing side surface of the cross dichroic prism 45.

Figure 15:
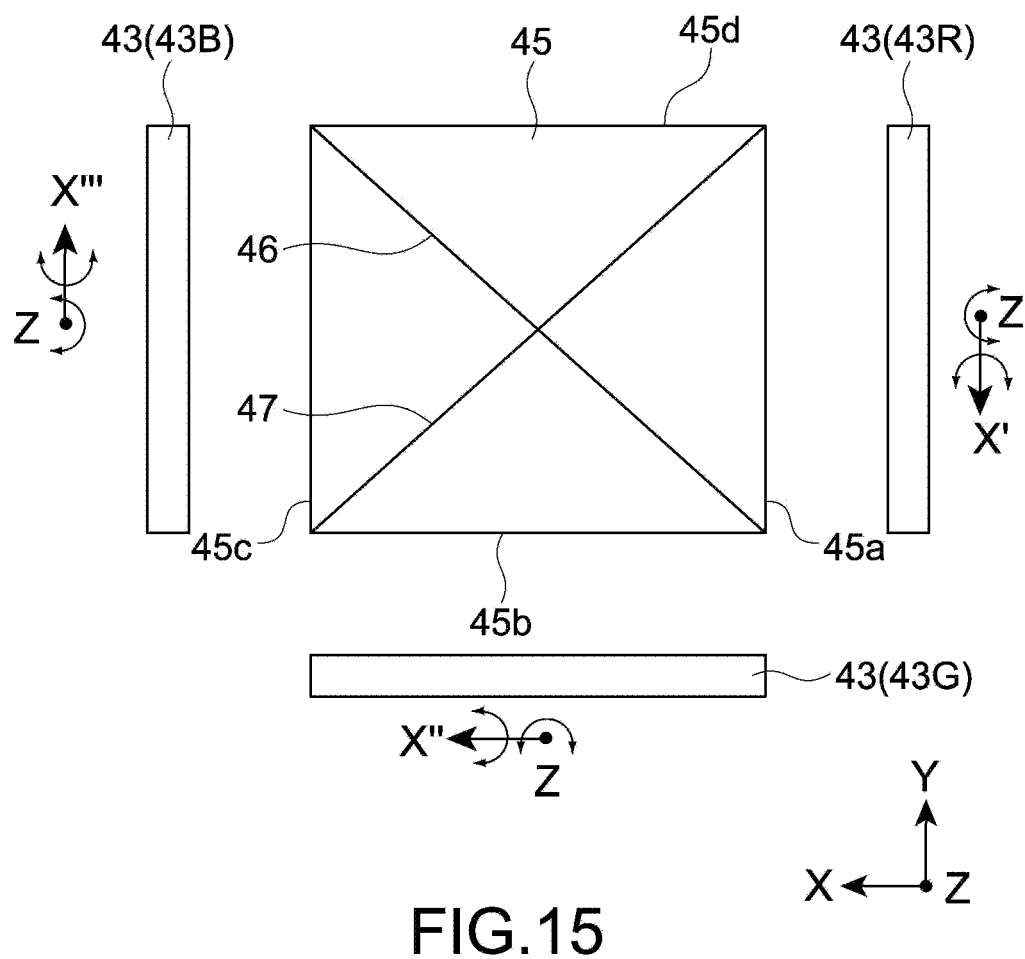
FIG. 15 A diagram for explaining the light-emitting-side polarization plate being arranged while being tilted with respect to an opposing side surface in a cross dichroic prism.

Typically, at least one of the 3 light-emitting-side polarization plates 43 is rotated about at least one of two orthogonal axes while being parallel to the opposing side surface of the cross dichroic prism 45. FIG. 15 is a diagram for explaining this.

In FIG. 15, a coordinate system based on the projector 100 includes the X axis, the Y axis, and the Z axis. Further, a coordinate system based on the first light-emitting-side polarization plate 43R includes the X' axis and the Z axis, and a coordinate system based on the second light-emitting-side polarization plate 43G includes the X" axis and the Z axis. Similarly, a coordinate system based on the third light-emitting-side polarization plate 43B includes the X''' axis and the Z axis.

Here, the X'-axis direction is an in-plane direction parallel to the light-emitting surface in the first light-emitting-side polarization plate 43R and is a direction vertical to the Z-axis direction (longitudinal direction). Similarly, the X"-axis direction is an in-plane direction parallel to the light-emitting surface in the second light-emitting-side polarization plate 43G and is a direction vertical to the Z-axis direction (longitudinal direction). Similarly, the X'''-axis direction is an in-plane direction parallel to the light-emitting surface in the third light-emitting-side polarization plate 43B and is a direction vertical to the Z-axis direction (longitudinal direction).

It should be noted that in the coordinate system of the X' axis and the Z axis, the coordinate system of the X" axis and the Z axis, and the coordinate system of the X" axis and the Z axis, the X' axis, the X" axis, and the X" axis vary together with the light-emitting-side polarization plate 43 in accordance with the rotation of the light-emitting-side polarization plate 43. On the other hand, the Z axis does not vary even when the light-emitting-side polarization plate 43 is rotated.

The method of taking coordinates in FIGS. 16 to 20 to be described later is similar to that of FIG. 15.

The first light-emitting-side polarization plate 43R is arranged so as to be rotated about the Z axis (first axis) from a state where it is parallel to the opposing first side surface 45a of the cross dichroic prism 45 (note that Z-axis direction (longitudinal direction) is direction in which intersecting axis of dichroic films 46 and 47 extends). As the first light-emitting-side polarization plate 43R is arranged so as to be rotated about the Z axis (first axis), a first light-emitting-side polarization becomes an angle deviated 45° from the dichroic films 46 and 47 when seen in the Z-axis direction.

Alternatively, the first light-emitting-side polarization plate 43R is arranged so as to be rotated about the X' axis (second axis: direction orthogonal to Z axis) from the state where it is parallel to the opposing first side surface 45a of the cross dichroic prism 45. Alternatively, the first light-emitting-side polarization plate 43R may be arranged so as to be rotated about both the Z axis and the X' axis.

Similarly, the second light-emitting-side polarization plate 43G is arranged so as to be rotated about the Z axis (first axis) from a state where it is parallel to the opposing second side surface 45*b* of the cross dichroic prism 45. As the second light-emitting-side polarization plate 43G is arranged so as to be rotated about the Z axis, a first light-emitting-side polarization becomes an angle deviated 45° from the dichroic films 46 and 47 when seen in the Z-axis direction.

Alternatively, the second light-emitting-side polarization plate 43G is arranged so as to be rotated about the X" axis (second axis: direction orthogonal to Z axis) from the state where it is parallel to the opposing second side surface 45*b* of the cross dichroic prism 45. Alternatively, the second light-emitting-side polarization plate 43G may be arranged so as to be rotated about both the Z axis and the X" axis.

Similarly, the third light-emitting-side polarization plate 43B is arranged so as to be rotated about the Z axis (first axis) from a state where it is parallel to the opposing third side surface 45*c* of the cross dichroic prism 45. As the third light-emitting-side polarization plate 43B is arranged so as to be rotated about the Z axis, a third light-emitting-side polarization becomes an angle deviated 45° from the dichroic films 46 and 47 when seen in the Z-axis direction.

Alternatively, the third light-emitting-side polarization plate 43B is arranged so as to be rotated about the X'" axis (second axis: direction orthogonal to Z axis) from the state where it is parallel to the opposing third side surface 45*c* of the cross dichroic prism 45. Alternatively, the second light-emitting-side polarization plate 43G may be arranged so as to be rotated about both the Z axis and the X'" axis.

Here, one of the 3 light-emitting-side polarization plates 43 may be rotated about the Z axis, or 2 of the 3 light-emitting-side polarization plates 43 may be rotated about the Z axis. Alternatively, all of the 3 light-emitting-side polarization plates 43 may be rotated about the Z axis.

Moreover, one of the 3 light-emitting-side polarization plates 43 may be rotated about the X' axis, the X" axis, and the X'" axis, or 2 of the 3 light-emitting-side polarization plates 43 may be rotated about the X' axis, the X" axis, and the X'" axis. Alternatively, all of the 3 light-emitting-side polarization plates 43 may be rotated about the X' axis, the X" axis, and the X'" axis.

Furthermore, one of the 3 light-emitting-side polarization plates 43 may be rotated about both of the axes, or 2 of the 3 light-emitting-side polarization plates 43 may be rotated about both of the axes. Alternatively, all of the 3 light-emitting-side polarization plates 43 may be rotated about both of the axes.

[Rotation About Vertical Axis]

Figure 16:
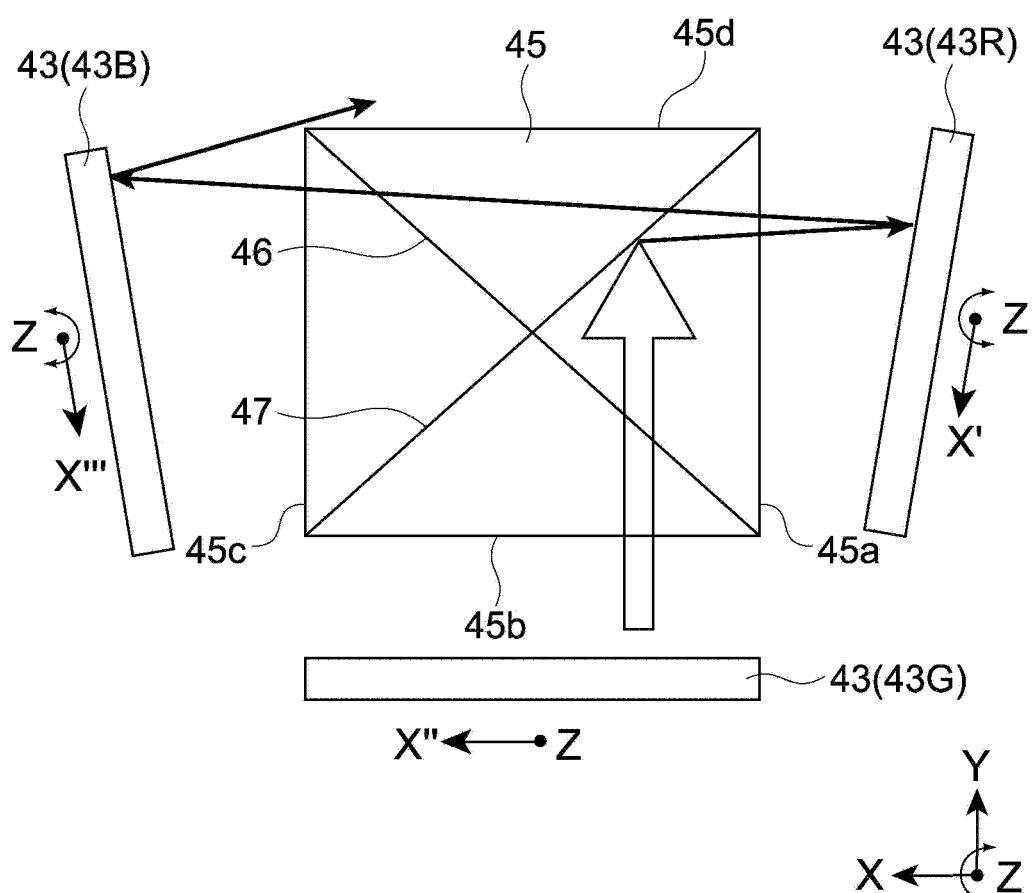
FIG. 16 A schematic top view showing an example of a case where a first light-emitting-side polarization plate and a third light-emitting-side polarization plate are rotated about a Z axis from a state where they are parallel to opposing side surfaces.

FIG. 16 is a schematic top view showing an example of a case where the first light-emitting-side polarization plate 43R and the third light-emitting-side polarization plate 43B are rotated about the Z axis from a state where they are parallel to the opposing side surfaces. In the example shown in FIG. 16, the first light-emitting-side polarization plate 43R and the third light-emitting-side polarization plate 43B are arranged such that an interval between the plates gradually widens in a direction from the second side surface 45*b* to the fourth side surface 45*d* (light-emitting surface) of the cross dichroic prism 45 (i.e., inverse rotation about Z axis).

A light movement shown in FIG. 16 will be described. It should be noted that this light movement corresponds to the light movement (2) shown in FIG. 13. Green light (see white arrow) that is transmitted through the second light-emitting-side polarization plate 43G enters the cross dichroic prism 45, is transmitted through the first dichroic film 46, and then enters the second dichroic film 47. Although green light is originally transmitted through the second dichroic film 47 since the second dichroic film 47 transmits green light, partial light is reflected by the second dichroic film 47. The light reflected by the second dichroic film 47 enters the light-emitting surface side of the first light-emitting-side polarization plate 43R.

The light that has entered the light-emitting surface side of the first light-emitting-side polarization plate 43R is reflected by the wires 48 formed on the light-emitting surface side of the first light-emitting-side polarization plate 43R. Since the first light-emitting-side polarization plate 43R is arranged while being rotated about the Z axis, the light that has entered the first light-emitting-side polarization plate 43R is reflected in a direction different from the light-incident direction. Specifically, the light that has entered the first light-emitting-side polarization plate 43R is reflected while being deviated on the light-emitting surface side of the cross dichroic prism 45.

This light is transmitted through the first dichroic film 46 after being transmitted through the second dichroic film 47 and enters the third light-emitting-side polarization plate 43B. The light that has entered the light-emitting surface side of the third light-emitting-side polarization plate 43B is reflected by the wires 48 formed on the light-emitting surface side of the third light-emitting-side polarization plate 43B. Since the third light-emitting-side polarization plate 43B is arranged while being rotated about the Z axis, the light that has entered the third light-emitting-side polarization plate 43B is reflected such that components in a direction toward the light-emitting surface side of the cross dichroic prism 45 increase. Then, the light reflected by the third light-emitting-side polarization plate 43B is discharged outside the optical path.

By rotating the first light-emitting-side polarization plate 43R and the third light-emitting-side polarization plate 43B about the Z axis from the state where they are parallel to the opposing side surfaces in this way, unnecessary light can be appropriately discharged outside the optical path. Accordingly, generation of ghosts can appropriately be prevented from occurring.

It should be noted that even when the first light-emitting-side polarization plate 43R and the third light-emitting-side polarization plate 43B are rotated about the Z axis, if they are rotated in the same direction about the Z axis, there is a fear that diffused reflection will be repeated.

Therefore, as shown in FIG. 16, it is effective to arrange the first light-emitting-side polarization plate 43R and the third light-emitting-side polarization plate 43B such that an interval therebetween gradually increases in a direction from the second side surface 45*b* to the fourth side surface 45*d* (light-emitting surface) (i.e., inverse rotation about Z axis). It should be noted that conversely, it is also possible to arrange the first light-emitting-side polarization plate 43R and the third light-emitting-side polarization plate 43B such that the interval therebetween gradually increases in a direction from the fourth side surface 45*d* (light-emitting surface) to the second side surface 45*b* (i.e., inverse rotation about Z axis). This case also bears similar effects.

[Rotation About Horizontal Axis]

Figure 17:
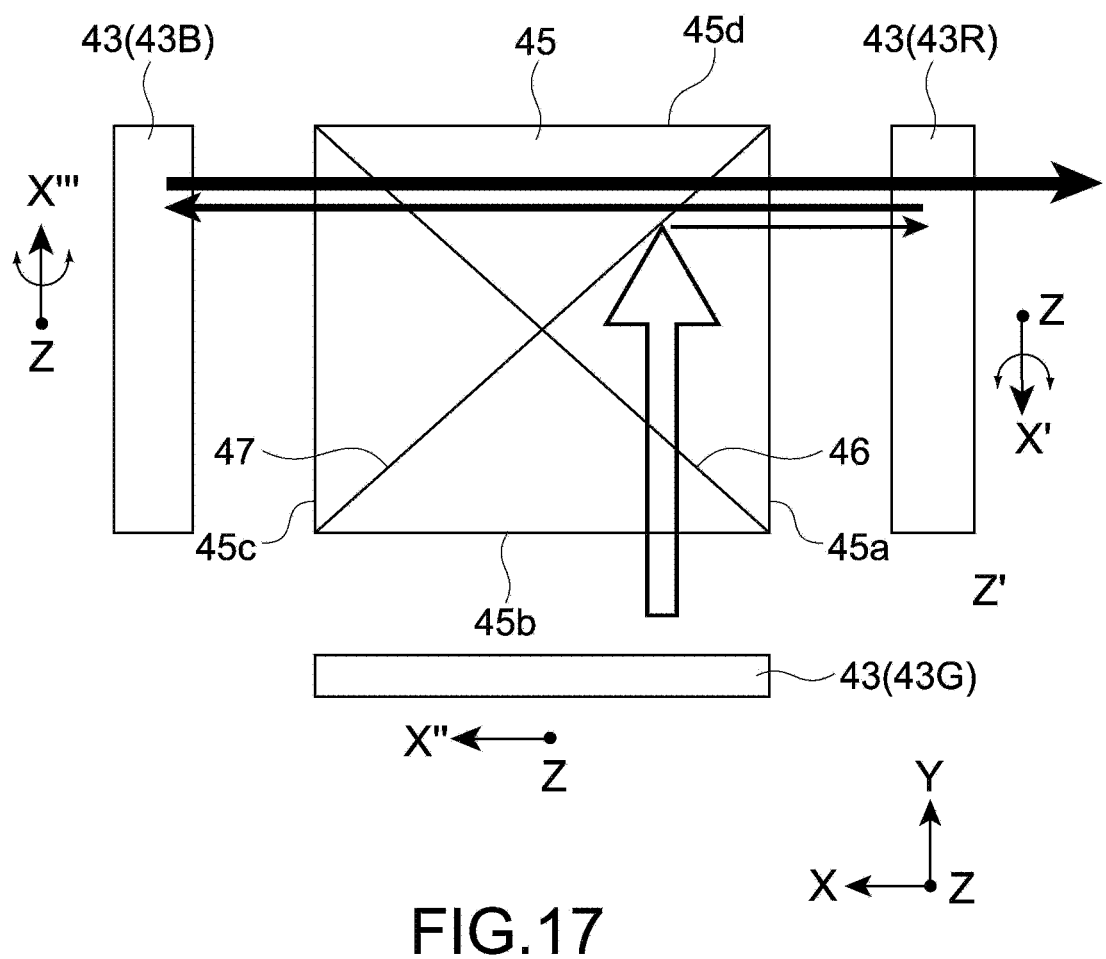
FIG. 17 A schematic top view showing an example of a case where the first light-emitting-side polarization plate and the third light-emitting-side polarization plate are rotated about an X' axis and X''' axis from a state where they are parallel to the opposing side surfaces.
Figure 18:
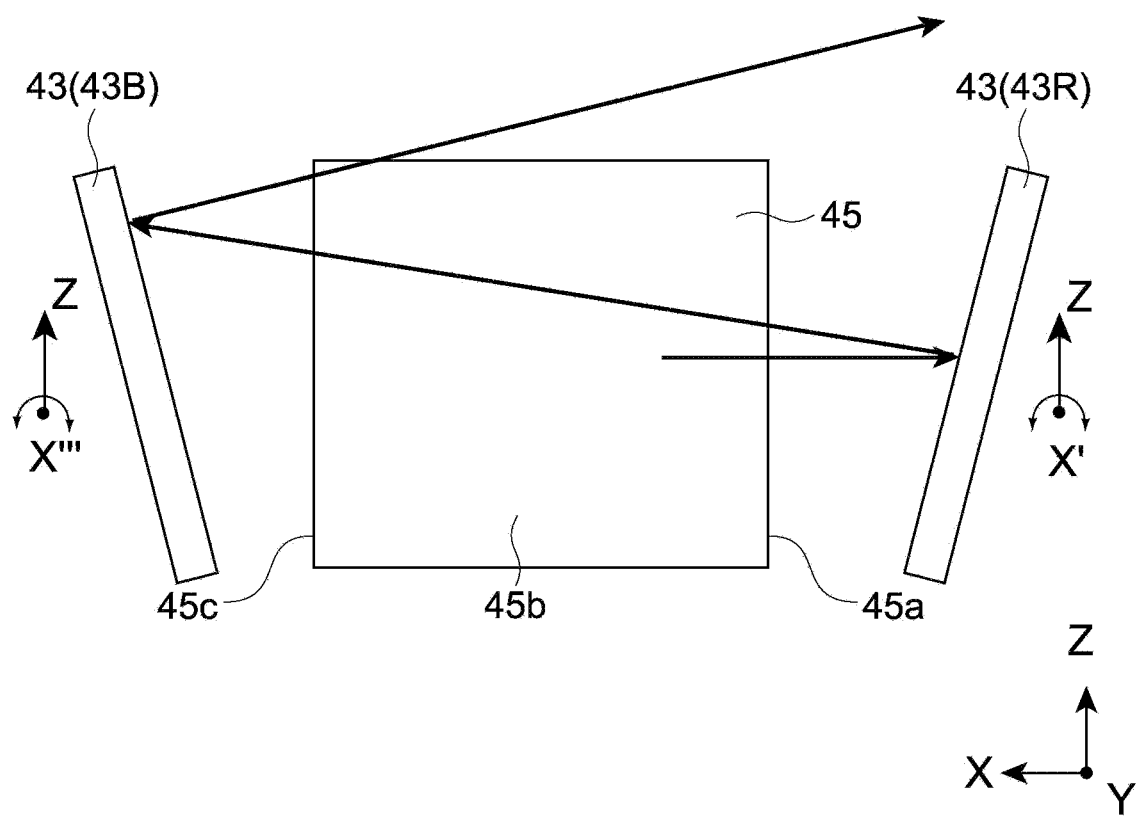
FIG. 18 A schematic side view regarding the example shown in FIG. 17.

FIG. 17 is a schematic top view showing an example of a case where the first light-emitting-side polarization plate 43R and the third light-emitting-side polarization plate 43B are rotated about the X' axis and the X'" axis from the state where they are parallel to the opposing side surfaces. FIG. 18 is a schematic side view regarding the example shown in FIG. 17. It should be noted that in FIG. 18, an illustration of the second light-emitting-side polarization plate 43G is omitted.

In the example shown in FIGS. 17 and 18, the first light-emitting-side polarization plate 43R and the third light-emitting-side polarization plate 43B are arranged such that the light-emitting surfaces thereof (surfaces on sides corresponding to cross dichroic prism 45) face upward (same side) in the Z-axis direction.

A light movement shown in FIGS. 17 and 18 will be described. It should be noted that this light movement corresponds to the light movement (2) shown in FIG. 13. Green light (see white arrow) that is transmitted through the second light-emitting-side polarization plate 43G enters the cross dichroic prism 45, is transmitted through the first dichroic film 46, and then enters the second dichroic film 47. Although green light is originally transmitted through the second dichroic film 47 since the second dichroic film 47 transmits green light, partial light is reflected by the second dichroic film 47. The light reflected by the second dichroic film 47 enters the light-emitting surface side of the first light-emitting-side polarization plate 43R.

The light that has entered the light-emitting surface side of the first light-emitting-side polarization plate 43R is reflected by the wires 48 formed on the light-emitting surface side of the first light-emitting-side polarization plate 43R. Since the first light-emitting-side polarization plate 43R is arranged while being rotated about the X' axis, the light that has entered the first light-emitting-side polarization plate 43R is reflected in a direction different from the light-incident direction in the Z-axis direction. Specifically, the light that has entered the first light-emitting-side polarization plate 43R is reflected upwardly.

This light is transmitted through the first dichroic film 46 after being transmitted through the second dichroic film 47 and enters the third light-emitting-side polarization plate 43B. The light that has entered the light-emitting surface side of the third light-emitting-side polarization plate 43B is reflected by the wires 48 formed on the light-emitting surface side of the third light-emitting-side polarization plate 43B. Since the third light-emitting-side polarization plate 43B is arranged while being rotated about the X''' axis, the light that has entered the third light-emitting-side polarization plate 43B is reflected such that components in an upward direction increase. Then, the light reflected by the third light-emitting-side polarization plate 43B is discharged outside the optical path.

By rotating the first light-emitting-side polarization plate 43R and the third light-emitting-side polarization plate 43B about the X' axis and the X''' axis from the state where they are parallel to the opposing side surfaces in this way, unnecessary light can be appropriately discharged outside the optical path. Accordingly, generation of ghosts can appropriately be prevented from occurring.

It should be noted that even when the first light-emitting-side polarization plate 43R and the third light-emitting-side polarization plate 43B are rotated about the X'' axis and the X''' axis, if they are arranged such that the light-emitting surfaces thereof face different sides in the Z-axis direction, there is a fear that diffused reflection will be repeated.

Therefore, as shown in FIGS. 17 and 18, it is effective to arrange the first light-emitting-side polarization plate 43R and the third light-emitting-side polarization plate 43B such that the light-emitting surfaces thereof face upward (same side) in the Z-axis direction. Conversely, it is also possible to arrange the first light-emitting-side polarization plate 43R and the third light-emitting-side polarization plate 43B such that the light-emitting surfaces thereof face downward (same side) in the Z-axis direction. This case also bears similar effects.

It should be noted that it is also possible to arrange all the light-emitting-side polarization plates 43 such that the light-emitting surfaces thereof face the same side in the Z-axis direction. In this case, the effect of preventing ghosts from being generated becomes larger.

[Rotation About Both Axes]

Figure 19:
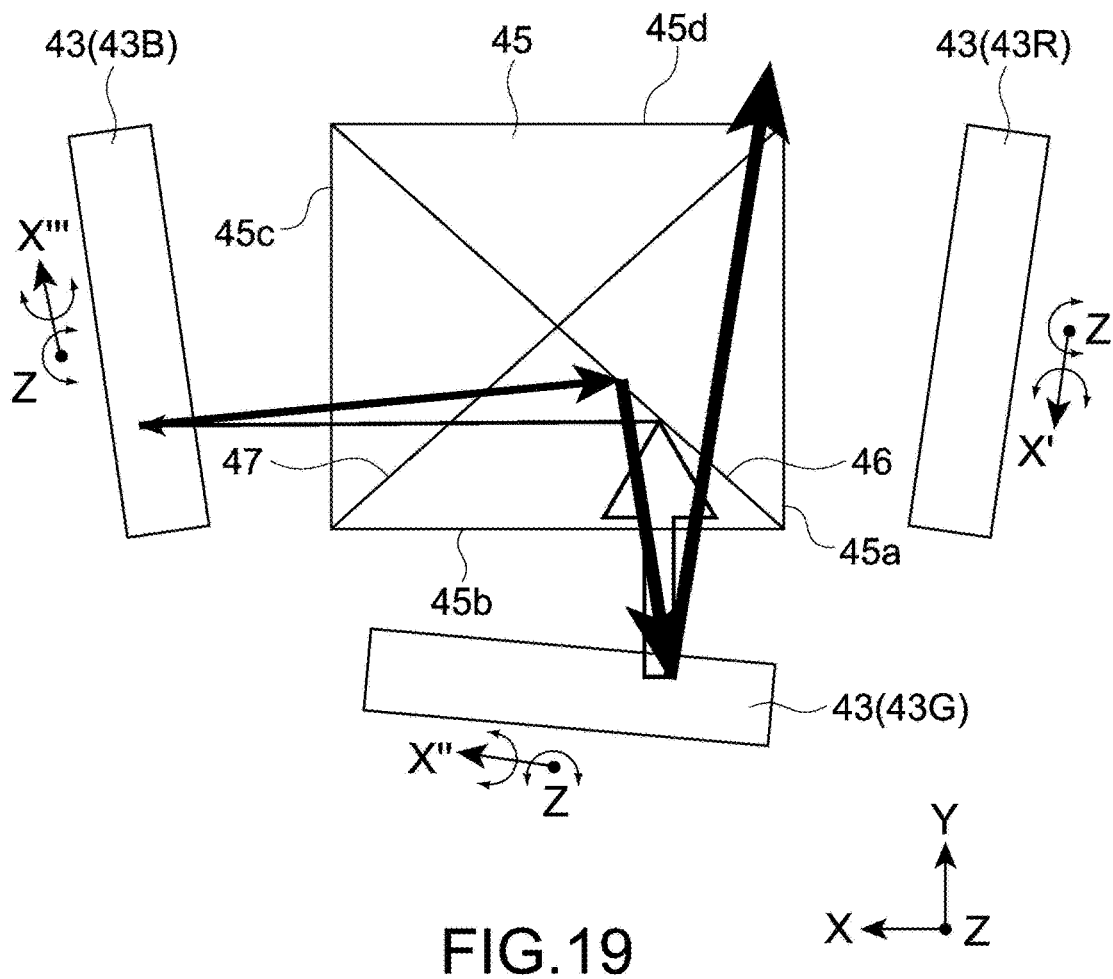
FIG. 19 A schematic top view showing an example of a case where the first light-emitting-side polarization plate, a second light-emitting-side polarization plate, and the third light-emitting-side polarization plate are rotated about both axes from a state where they are parallel to the opposing side surfaces.

FIG. 19 is a schematic top view showing an example of a case where the first light-emitting-side polarization plate 43R, the second light-emitting-side polarization plate 43G, and the third light-emitting-side polarization plate 43B are rotated about both axes from a state where they are parallel to the opposing side surfaces.

In FIG. 19, the first light-emitting-side polarization plate 43R and the third light-emitting-side polarization plate 43B are arranged such that an interval therebetween gradually increases in a direction from the second side surface 45b to the fourth side surface 45d (light-emitting surface) of the cross dichroic prism 45 (i.e., inverse rotation about Z axis). Further, the second light-emitting-side polarization plate 43G is rotated about the Z axis in the same direction as the first light-emitting-side polarization plate 43R (inverse is also possible).

Furthermore, in the example shown in FIG. 19, the first light-emitting-side polarization plate 43R, the second light-emitting-side polarization plate 43G, and the third light-emitting-side polarization plate 43B are arranged such that the light-emitting surfaces thereof face upward (same side) in the Z-axis direction (may alternatively face downward).

A light movement shown in FIG. 19 will be described. It should be noted that this light movement corresponds to the light movement (1) shown in FIG. 14. Green light (see white arrow) that is transmitted through the second light-emitting-side polarization plate 43G enters the cross dichroic prism 45 and then enters the first dichroic film 46. Although green light is originally transmitted through the first dichroic film 46 since the first dichroic film 46 transmits green light, partial light is reflected by the first dichroic film 46. The light reflected by the first dichroic film 46 is transmitted through the second dichroic film 47 and enters the light-emitting surface side of the third light-emitting-side polarization plate 43B.

The light that has entered the light-emitting surface side of the third light-emitting-side polarization plate 43B is reflected by the wires 48 formed on the light-emitting surface side of the third light-emitting-side polarization plate 43B. Since the third light-emitting-side polarization plate 43B is arranged while being rotated about the Z axis, the light that has entered the third light-emitting-side polarization plate 43B is reflected while being deviated on the light-emitting surface side of the cross dichroic prism 45. Further, since the third light-emitting-side polarization plate 43B is arranged while being rotated about the X''' axis, the light that has entered the first light-emitting-side polarization plate 43R is reflected upwardly.

This light enters the first dichroic film 46 after being transmitted through the second dichroic film 47. Although green light is originally transmitted through the second dichroic film 47 since the first dichroic film 46 transmits green light, partial light is reflected by the first dichroic film 46.

The light reflected by the first dichroic film 46 enters the light-emitting surface side of the second light-emitting-side polarization plate 43G. The light that has entered the light-emitting surface side of the second light-emitting-side polarization plate 43G is reflected by the wires 48 formed on the light-emitting surface side of the second light-emitting-side polarization plate 43G. Since the second light-emitting-side polarization plate 43G is arranged while being rotated about the Z axis, the light that has entered from the third light-emitting-side polarization plate 43B is reflected while being deviated on the first side surface 45a side of the cross dichroic prism 45. Further, since the second light-emitting-side polarization plate 43G is arranged while being rotated about the X" axis, the light that has entered the second light-emitting-side polarization plate 43G is reflected such that components in the upward direction increase. Then, the light reflected by the second light-emitting-side polarization plate 43G is discharged outside the optical path.

By rotating the first light-emitting-side polarization plate 43R, the second light-emitting-side polarization plate 43G, and the third light-emitting-side polarization plate 43B about both of the axes from the state where they are parallel to the opposing side surfaces in this way, unnecessary light can be appropriately discharged outside the optical path. Accordingly, generation of ghosts can appropriately be prevented from occurring. Particularly, rotating the light-emitting-side polarization plates 43 about both of the axes is effective since unnecessary light can be discharged in both the longitudinal direction and the horizontal direction.

[Relationship Between Tilt Angle of Light-Emitting-Side Polarization Plate 43 and Direction of Wires 48 on Light-Emitting-Side Polarization Plate 43]

Next, a relationship between a tilt angle of the light-emitting-side polarization plate 43 and a direction of the wires 48 on the light-emitting-side polarization plate 43 will be described.

Figure 20:
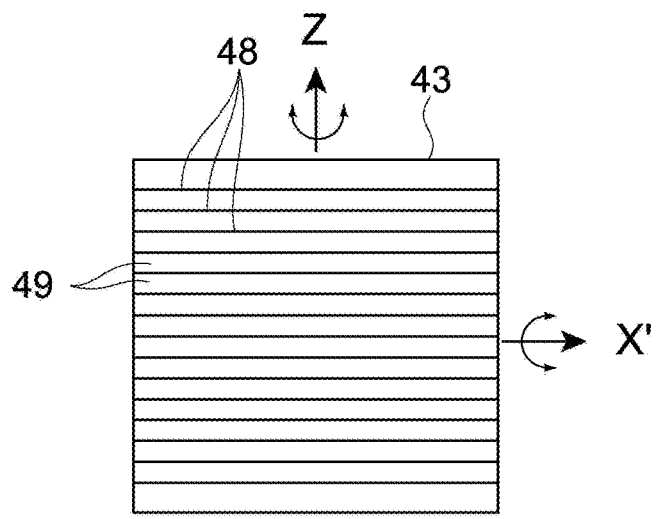
FIG. 20 A diagram for explaining a relationship between a tilt angle of the light-emitting-side polarization plate and a wire direction of the light-emitting-side polarization plate.

FIG. 20 is a diagram for explaining this. As shown in FIG. 20, in this embodiment, the light-emitting-side polarization plate 43 includes the plurality of wires 48 that are formed to extend in the X'-axis, the X"-axis, or the X'"-axis direction (first direction) and be aligned along the Z-axis direction (second direction: direction orthogonal to first direction).

Here, in the viewpoint of discharging unnecessary light outside the optical path, it is better to tilt the light-emitting-side polarization plate 43 as much as possible. On the other hand, there is a limit in the tilt angle of the light-emitting-side polarization plate 43.

First, descriptions will be given on a case where the light-emitting-side polarization plate 43 is rotated using the X' axis, the X" axis, or the X'" axis as a center axis of the rotation, from a state where it is parallel to the opposing side surface of the cross dichroic prism 45.

As the light-emitting-side polarization plate 43 is rotated in the X' axis, the X" axis, or the X'" axis, intervals of the wires 48 in terms of the appearance when seen in the optical-axis direction gradually become small. As the intervals of the wires 48 become small in this way, for example, there is an advantage that contrast is improved. On the other hand, if the light-emitting-side polarization plate 43 is rotated a certain angle (e.g., about 15°) or more, there is a fear that this time, the light-emitting-side polarization plate 43 will not function effectively.

Therefore, the angle to be rotated about the X' axis, the X" axis, or the X'" axis is typically set to be smaller than 15°.

Next, descriptions will be given on a case where the light-emitting-side polarization plate 43 is rotated using the Z axis as the center axis of the rotation, from the state where it is parallel to the opposing side surface of the cross dichroic prism 45. In this case, the intervals of the wires 48 in terms of the appearance do not gradually become small, and characteristics do not change much even when the rotation angle is increased to some extent. Therefore, it is possible to rotate the light-emitting-side polarization plate 43 about 45°, for example.

In other words, for the light-emitting-side polarization plate 43, the angle to be rotated about the Z axis (tilt angle with respect to corresponding side surface) can be set to be larger than the angle to be rotated about the X' axis, the X" axis, or the X'" axis. By setting the angle to be rotated about the Z axis to become larger than the angle to be rotated about the X' axis, the X" axis, or the X'" axis in this way, a ghost can appropriately be prevented from occurring while improving contrast (e.g., improvement of contrast etc. is expected with angle smaller than 15°).

The technology of rotating the light-emitting-side polarization plate 43 is also applicable to a case where the lightbulb is a reflection-type liquid crystal lightbulb 41.

The present technology can also take the following configurations.

(1) A projector, including:
   a lightbulb that modulates light;
   a projection section that projects light modulated by the lightbulb; and
   a replacement mechanism that holds a transmissive member arranged on an optical path between the lightbulb and the projection section and is capable of replacing the transmissive member.

(2) The projector according to (1), in which
   the replacement mechanism includes a transmissive member holding portion that detachably holds the transmissive member.

(3) The projector according to (2), in which
   the projection section is replaceable with respect to the projector,
   the projector further includes an exterior casing that includes an opening into which a part of the projection section can be inserted, and
   the transmissive member is replaced via the opening of the exterior casing in a state where the projection section is detached from the projector.

(4) The projector according to any one of (1) to (3), in which
   the lightbulb is a liquid crystal lightbulb,
   the projector further includes a cross dichroic prism that is arranged on an optical path between the liquid crystal lightbulb and the projection section, and
   the transmissive member is arranged on an optical path between the cross dichroic prism and the projection section.

(5) The projector according to (4), in which
   the transmissive member is arranged at a position closer to a light-emitting surface of the cross dichroic prism than a light-incident surface of the projection section.

(6) The projector according to (4), in which
   the replacement mechanism includes a transmissive member holding portion that detachably holds the transmissive member and holds the cross dichroic prism.

(7) The projector according to any one of (2) to (6), in which
   the transmissive member is held by a holder, and
   the transmissive member holding portion detachably holds the holder.

(8) The projector according to (7), in which
   the transmissive member holding portion includes an opening that transmits light modulated by the lightbulb, and
   the holder is held by the transmissive member holding portion such that the holder covers the opening.

(9) The projector according to (7), in which
   the attachment/detachment portion includes a first engagement groove and a second engagement groove, and
   the holder includes a first engagement portion that is provided on one end portion side of the holder and engages with the first engagement groove and a second engagement portion that is provided on another end portion side of the holder and engages with the second engagement groove via a bias portion.

(10) The projector according to any one of (1) to (9), in which the replacement mechanism holds, on the optical path, a functional filter or the substitute glass plate as the transmissive member.

REFERENCE SIGNS LIST 10 light source section
20 image generation section
40 optical unit
41 liquid crystal lightbulb
42 light-incident-side polarization plate
43 light-emitting-side polarization plate
44 polarization conversion plate
45 cross dichroic prism
46 first dichroic film
47 second dichroic film
48 wire
49 groove
50 cooling section
51 blower mechanism
60 projection section
70 transmissive member
70a functional filter
70b substitute glass plate
72 holder
80 transmissive member holding portion
81 transmissive member attachment/detachment portion
100 projector

The invention claimed is:

1. A projector, comprising:
a lightbulb that modulates light;
a projection section including a lens that projects light modulated by the lightbulb; and
a replacement mechanism including a transmissive member holding portion that detachably holds a transmissive member of a plurality of different types, the transmissive member holding portion holds the transmissive member at a fixed position on an optical path between the lightbulb and the projection section.

2. The projector according to claim 1, wherein
the projection section is replaceable with respect to the projector,
the projector further comprises an exterior casing that includes an opening into which a part of the projection section can be inserted, and
the transmissive member is replaced via the opening of the exterior casing in a state where the projection section is detached from the projector.

3. The projector according to claim 1, wherein
the lightbulb is a liquid crystal lightbulb,
the projector further comprises a cross dichroic prism that is arranged on an optical path between the liquid crystal lightbulb and the projection section, and
the transmissive member is arranged on an optical path between the cross dichroic prism and the projection section.

4. The projector according to claim 3, wherein
the transmissive member is arranged at a position closer to a light-emitting surface of the cross dichroic prism than a light-incident surface of the projection section.

5. The projector according to claim 3, wherein
the transmissive member holding portion detachably holds the transmissive member and holds the cross dichroic prism.

6. The projector according to claim 1 wherein
the transmissive member is held by a holder, and
the transmissive member holding portion detachably holds the holder.

7. The projector according to claim 6, wherein
the transmissive member holding portion includes an opening that transmits light modulated by the lightbulb, and
the holder is held by the transmissive member holding portion such that the holder covers the opening.

8. The projector according to claim 6, wherein
the transmissive member holding portion includes a first engagement groove and a second engagement groove, and
the holder includes a first engagement portion that is provided on one end portion side of the holder and engages with the first engagement groove and a second engagement portion that is provided on another end portion side of the holder and engages with the second engagement groove via a bias portion.

9. The projector according to claim 1, wherein
the replacement mechanism holds, on the optical path, a functional filter or a substitute glass plate as the transmissive member.

10. A functional filter used in a projector including a replacement mechanism that includes a transmissive member holding portion, the transmissive member holding portion detachably holds, in a replaceable manner, a transmissive member of a plurality of different types, the functional filter being one of the plurality of different types and held by the transmissive member holding portion at a fixed position on an optical path between a lightbulb that modulates light and a projection section including a lens that projects light modulated by the lightbulb.

11. A substitute glass plate used in a projector including a replacement mechanism that includes a transmissive member holding portion, the transmissive member holding portion detachably holds, in a replaceable manner, a transmissive member of a plurality of different types, the substitute glass plate being one of the plurality of different types and held by the transmissive member holding portion at a fixed position on an optical path between a lightbulb that modulates light and a projection section including a lens that projects light modulated by the lightbulb.

* * * * *